United States Patent
Koyama et al.

(10) Patent No.: US 7,909,260 B2
(45) Date of Patent: Mar. 22, 2011

(54) SEMICONDUCTOR DEVICE

(75) Inventors: Jun Koyama, Sagamihara (JP); Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/638,090

(22) Filed: Dec. 15, 2009

(65) Prior Publication Data

US 2010/0090016 A1    Apr. 15, 2010

Related U.S. Application Data

(63) Continuation of application No. 11/660,756, filed as application No. PCT/JP2005/016678 on Sep. 5, 2005, now Pat. No. 7,658,333.

(30) Foreign Application Priority Data

Sep. 10, 2004    (JP) ................. 2004-264718

(51) Int. Cl.
*G06K 19/06* (2006.01)
*G06K 7/08* (2006.01)

(52) U.S. Cl. .......... 235/492; 235/451; 257/50; 257/173; 257/529; 257/530; 365/225.7

(58) Field of Classification Search .................. 235/375, 235/380, 451, 487, 492; 257/50, 173, 529, 257/530; 365/225.7
See application file for complete search history.

(56) References Cited

U.S. PATENT DOCUMENTS

| | | | |
|---|---|---|---|
| 4,922,319 | A | 5/1990 | Fukushima |
| 5,736,728 | A | 4/1998 | Matsubara |
| 5,929,505 | A | 7/1999 | Takagi et al. |
| 6,025,780 | A | 2/2000 | Bowers et al. |
| 6,525,595 | B2 | 2/2003 | Oku |
| 6,583,490 | B2 | 6/2003 | Hagiwara et al. |
| 6,954,084 | B2 | 10/2005 | Islam |

(Continued)

FOREIGN PATENT DOCUMENTS

CN    1265215    8/2000

(Continued)

OTHER PUBLICATIONS

International Search Report (Application No. PCT/JP2005/016678) dated Dec. 27, 2005.

(Continued)

*Primary Examiner* — Thien M. Le
*Assistant Examiner* — Tuyen K Vo
(74) *Attorney, Agent, or Firm* — Eric J. Robinson; Robinson Intellectual Property Law Office, P.C.

(57) ABSTRACT

A semiconductor device used as an ID chip is provided, of which operation is terminated when its role is finished or expires. According to the invention, an antenna circuit, a voltage detecting circuit, a current amplifier circuit, a signal processing circuit, and a fuse are provided over an insulating substrate. When large power is applied to the antenna circuit, a voltage is detected by voltage detecting circuit and a corresponding current is amplified by the current amplifier circuit, thereby the fuse is melted down. Also, when an anti-fuse is used, the anti-fuse can short an insulating film by applying an excessive voltage. In this manner, the semiconductor device has a function for making it invalid by stopping operation of the signal processing circuit when the role of the device is finished or expires.

20 Claims, 29 Drawing Sheets

U.S. PATENT DOCUMENTS

| | | |
|---|---|---|
| 6,995,652 B2 | 2/2006 | Carrender et al. |
| 7,012,531 B2 | 3/2006 | Fries et al. |
| 7,121,472 B2 | 10/2006 | Shimizu et al. |
| 7,275,696 B2 | 10/2007 | Akita et al. |
| 7,347,379 B2 | 3/2008 | Ward et al. |
| 7,425,472 B2 | 9/2008 | Marr |
| 2004/0038458 A1 | 2/2004 | Marr |
| 2004/0070418 A1* | 4/2004 | Zimlich .......................... 326/10 |
| 2005/0006640 A1* | 1/2005 | Jackson et al. .................. 257/40 |
| 2005/0041507 A1* | 2/2005 | Otsuka ....................... 365/225.7 |
| 2005/0078537 A1* | 4/2005 | So et al. ........................ 365/211 |
| 2005/0174845 A1 | 8/2005 | Koyama et al. |
| 2006/0170535 A1* | 8/2006 | Watters et al. ............. 340/10.41 |

FOREIGN PATENT DOCUMENTS

| | | |
|---|---|---|
| EP | 1 429 301 | 6/2004 |
| JP | 05-129920 | 5/1993 |
| JP | 05-078575 | 10/1993 |
| JP | 07-160960 | 6/1995 |
| JP | 10-240889 | 9/1998 |
| JP | 2001-511574 | 8/2001 |
| JP | 2001-250393 | 9/2001 |
| JP | 2003-516595 | 5/2003 |
| WO | WO 99/05658 | 2/1999 |
| WO | WO 2004/053721 | 6/2004 |

OTHER PUBLICATIONS

Written Opinion (Application No. PCT/JP2005/016678) dated Dec. 27, 2005.

Official Action (Application Serial No. 200580030475.4) dated Feb. 13, 2009.

Search Report (Application No. 05782134.0) dated Apr. 29, 2009.

* cited by examiner

PRIOR ART

PRIOR ART

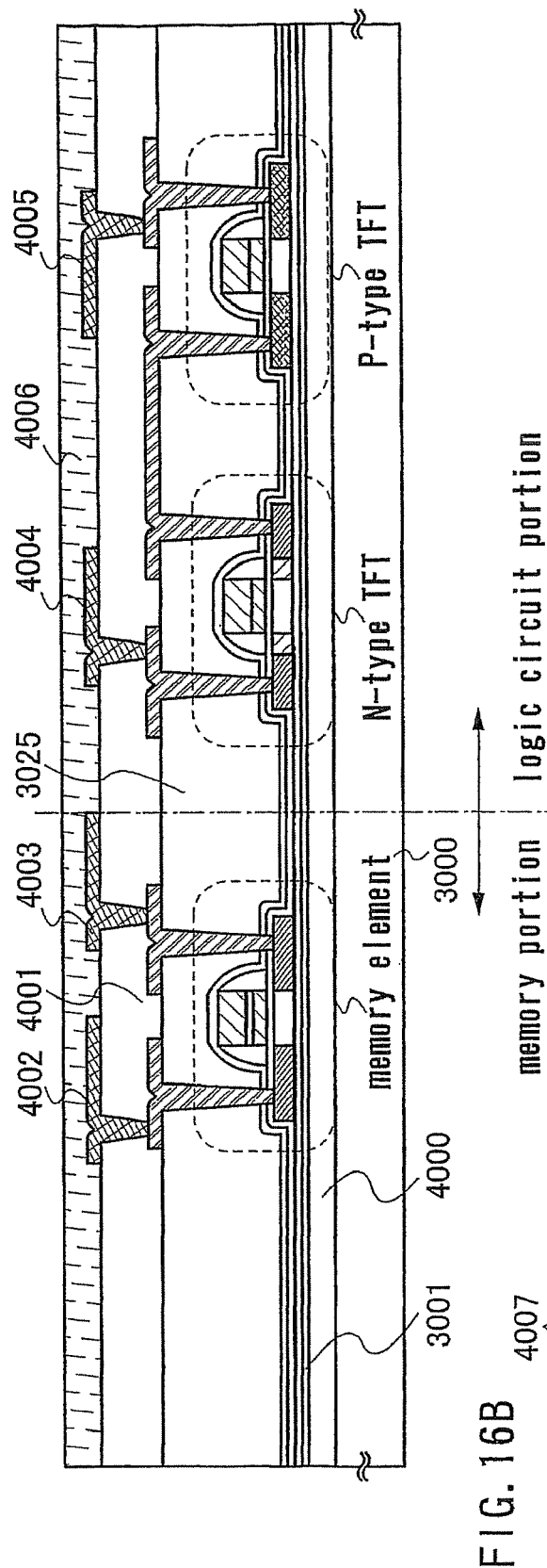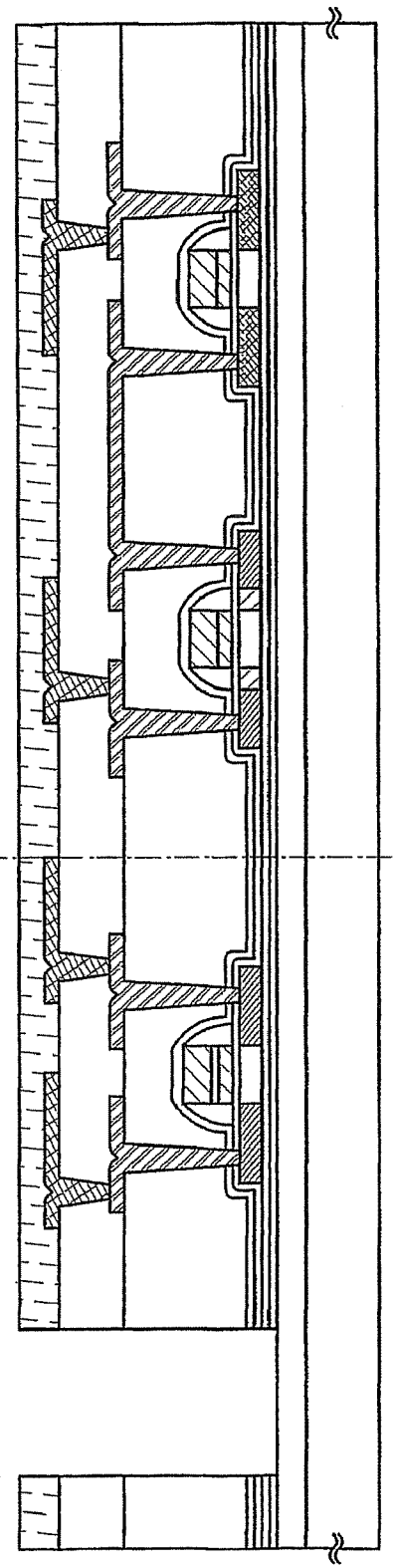
FIG. 16A
FIG. 16B

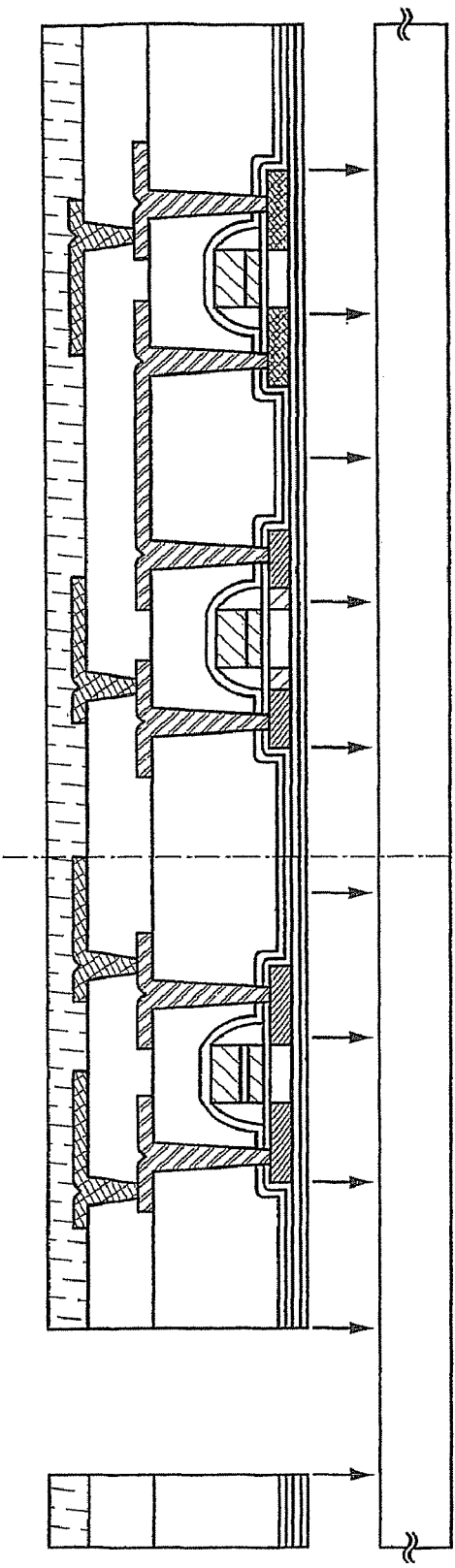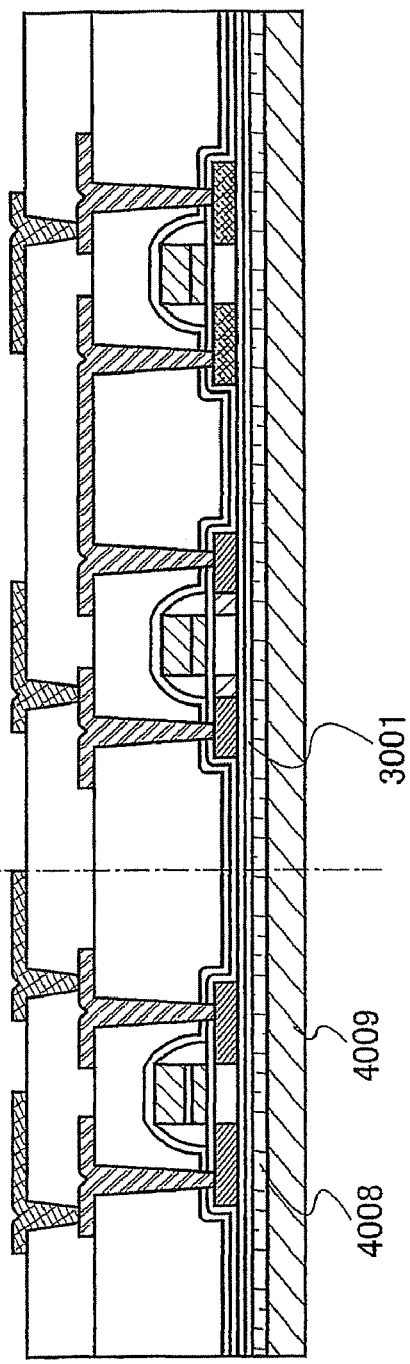
FIG. 17A
FIG. 17B 2601
2602

2603
2604

SEMICONDUCTOR DEVICE

TECHNICAL FIELD

The present invention relates to a semiconductor device used as an IC chip (hereinafter also referred to as an "ID chip") with which required data can be stored in a memory circuit therein or data can be read using a non-contact means such as wireless communication. In particular, the invention relates to a semiconductor device used as an ID chip formed over an insulating substrate such as glass and plastic.

BACKGROUND ART

In accordance with the development of computer technology and improvement of image recognition technology, data recognition using a medium such as a barcode has been widely used, and for example, used for data recognition of merchandise. A further larger amount of data recognition is expected to be processed in the future. However, data reading or the like using a barcode is disadvantageous in that a barcode reader is required to contact the barcode and the amount of data stored in a barcode is not very large. Therefore, data recognition without contact and increase of the memory capacity of a medium have been demanded.

In response to such demand, an ID chip using an IC is developed in recent years. An ID chip stores required data in a memory circuit within an IC chip and the data is read out by using a non-contact means, that is generally a wireless means. It is expected that commercial distribution and the like become simpler, cost thereof is reduced, and high security is provided when the ID chip comes into a practical use.

An overview of an individual recognition system using an ID chip is described with reference to FIG. 4. FIG. 4 illustrates an overview of an individual recognition system for obtaining individual data of a bag without contact. An ID chip 401 storing particular individual data is attached to or embedded in a bag 404. A radio wave is transmitted from an antenna unit 402 of an interrogator (also referred to as a reader/writer) 403 to the ID chip. When receiving the radio wave, the ID chip 401 sends back the individual data thereof to the antenna unit 402. The antenna unit 402 sends the individual data to the interrogator to identify it. In this manner, the interrogator 403 can obtain data of the bag 404. Furthermore, this system enables physical distribution management, counting, exclusion of a counterfeit, and the like.

An example of such an ID chip technology is shown in FIG. 2. A semiconductor device 200 used for an ID chip includes an antenna circuit 201, a rectifier circuit 202, a stabilizing power source circuit 203, an amplifier 208, a demodulating circuit 213, a logic circuit 209, a memory control circuit 212, a memory circuit 211, a logic circuit 207, an amplifier 206, and a modulating circuit 205. Further, the antenna circuit 201 includes an antenna coil 301 and a tuning capacitor 302 (FIG. 3A). The rectifier circuit 202 includes diodes 303 and 304 and a smoothing capacitor 305 (FIG. 3B). The portions other than the antenna circuit 201 are called a signal processing circuit 214.

An operation of the ID chip is described below. An AC signal received by the antenna circuit 201 is half-wave rectified by the diodes 303 and 304 and then smoothed by the smoothing capacitor 305. The smoothed voltage containing a number of ripples is stabilized by the stabilizing power source circuit 203, and the stabilized voltage is supplied to the demodulating circuit 213, the amplifier 206, the logic circuit 207, the amplifier 208, the logic circuit 209, the memory circuit 211, and the memory control circuit 212. On the other hand, a signal received by the antenna circuit 201 is inputted to the logic circuit 209 as a clock signal through the amplifier 208. Further, a signal inputted from the antenna is demodulated by the demodulating circuit 213 and inputted as data to the logic circuit 209.

In the logic circuit 209, the input data is decoded. The interrogator sends data after encoded with a deformation mirror code, an NRZ-L code, or the like and it is decoded by the logic circuit 209. The decoded data is sent to the memory control circuit 212, thereby data stored in the memory circuit 211 is read out. It is necessary that the memory circuit 211 be a nonvolatile memory circuit which is capable of storing data even when the power is OFF, and a masked ROM or the like is employed. The stored content is, for example, 16-byte data (see FIG. 12) which includes a 4-byte family code for indicating a series of the ID chip, a 4-byte application code, and two kinds of 4-byte user codes set by a user.

As for a transmitted/received signal, 125 kHz, 13.56 MHz, 915 MHz, 2.45 GHz or the like may be employed, to which the ISO standard or the like is applied. In addition, a modulation and demodulation system in transmission/reception is standardized. Patent Document 1 is an example of such an ID chip.

[Patent Document 1]
Japanese Patent Laid-Open No. 2001-250393

DISCLOSURE OF INVENTION

A conventional semiconductor device for an ID chip described above has the following problems. In the case where the ID chip is attached to merchandise, the ID chip responds to the interrogator even after a consumer has purchased the merchandise; therefore, what the consumer purchases is known to a third party and the privacy of the consumer cannot be protected. In addition, a certificate such as a passport using the ID chip may be abused after lapse owing to the expiration and the like, by rewriting the data. Therefore, an ID chip which is capable of stopping its operation after having completed its role and expired is demanded.

In view of the foregoing, the invention provides a semiconductor device which is used as an ID chip and capable of stopping its operation when it expires.

According to the invention, a fuse or an anti-fuse is provided in a semiconductor device used for an ID chip, and function of the ID chip is restricted after the fuse is melted down or the anti-fuse is shorted. The fuse can be melted down by a certain signal processing and the anti-fuse can be shorted by a certain signal processing, thereby data is not read out and written.

One aspect of the invention includes an antenna circuit, a voltage detecting circuit, a current amplifier circuit, a signal processing circuit, and a fuse having a first terminal and a second terminal. The antenna circuit is electrically connected to the signal processing circuit through at least the fuse, and the voltage detecting circuit is electrically connected to the antenna circuit. The current amplifier circuit is connected to the voltage detecting circuit and the second terminal of the fuse, and the signal processing circuit is connected to the second terminal of the fuse.

In the above-described configuration, the signal processing circuit can include a rectifier circuit and a modulating circuit.

In the above-described configuration, the voltage detecting circuit may include a diode.

In the above-described configuration, the voltage detecting circuit may include a comparator.

In the above-described configuration, the current amplifier circuit may include a current mirror circuit.

In the above-described configuration, a fuse element constituting the fuse can be melted down by flowing an excessive current thereto.

In the above-described configuration, the fuse element may be a metal wiring or a semiconductor thin film.

One aspect of the invention includes an antenna circuit, a signal processing circuit, and an anti-fuse over a substrate. Output of the antenna circuit is connected to the signal processing circuit and the anti-fuse.

In the above-described configuration, the signal processing circuit can include a rectifier circuit and a modulating circuit.

In the above-described configuration, an anti-fuse element constituting the anti-fuse can short an insulating film by applying an excessive voltage thereto. Note that the anti-fuse element may be constituted by a pair of conductive layers and the insulating film interposed between the pair of conductive layers.

In the above-described configuration, an anti-fuse element constituting the anti-fuse may include a diode, and can short a junction portion of the diode by applying an excessive voltage thereto. Note that the anti-fuse element may be the diode and the diode may have the junction portion.

In the above-described configuration, the signal processing circuit can be formed over a glass substrate.

In the above-described configuration, the signal processing circuit can be formed over a plastic substrate.

In the above-described configuration, the signal processing circuit can be formed over an insulating film.

In the above-described configuration, the antenna circuit can be provided above or partially above the signal processing circuit.

It is to be noted here that the fuse means a fuse element which is melted down to break a circuit when an excessive current flows thereto, and the anti-fuse means, contrary to the fuse, an anti-fuse element which becomes conductive when an excessive voltage is applied thereto.

By providing the fuse or the anti-fuse as is in the invention, an ID chip which stops its operation after lapse can be achieved. In this manner, data of the ID chip cannot be read out after lapse and consumers' privacy can be protected. Furthermore, abuse of a certificate and the like can be prevented after the expiration.

BRIEF DESCRIPTION OF DRAWINGS

FIGS. 16A and 16B are cross-sectional views each at a step of the invention.

FIGS. 17A and 17B are cross-sectional views each at a step of the invention.

BEST MODE FOR CARRYING OUT THE INVENTION

Figure 1:
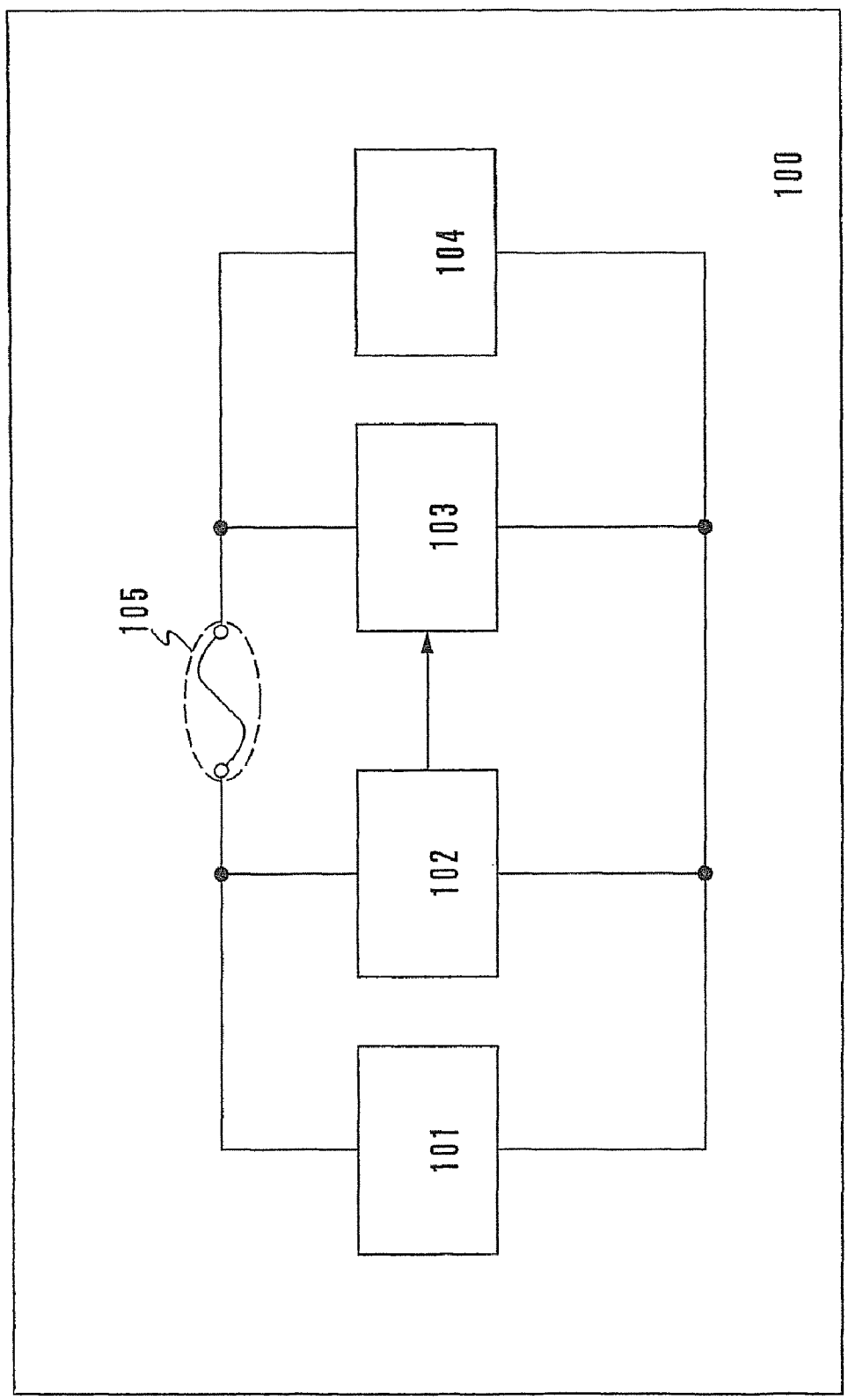
FIG. 1 is a block diagram showing a configuration of a semiconductor device of the invention.

Although the invention will be fully described by way of embodiment modes and embodiments with reference to the accompanying drawings, it is to be understood that various changes and modifications will be apparent to those skilled in the art. Therefore, unless otherwise such changes and modifications depart from the scope of the invention, they should be construed as being included therein. Note that identical portions or portions having the same functions in the drawings are denoted by the same reference numerals and detailed descriptions thereof are omitted.

Figure 2:
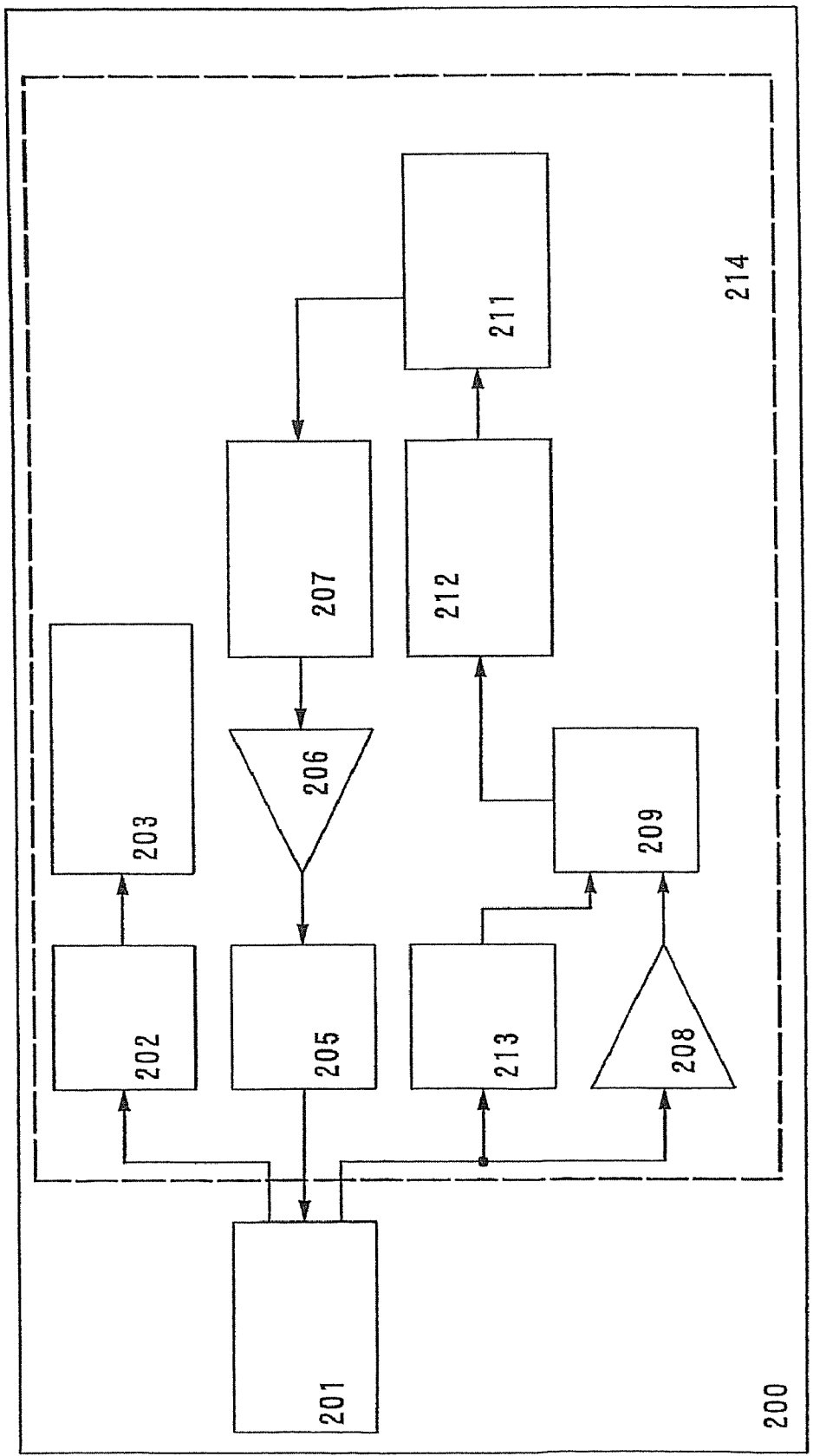
FIG. 2 is a block diagram showing a configuration of a conventional semiconductor device.
Figure 3A:
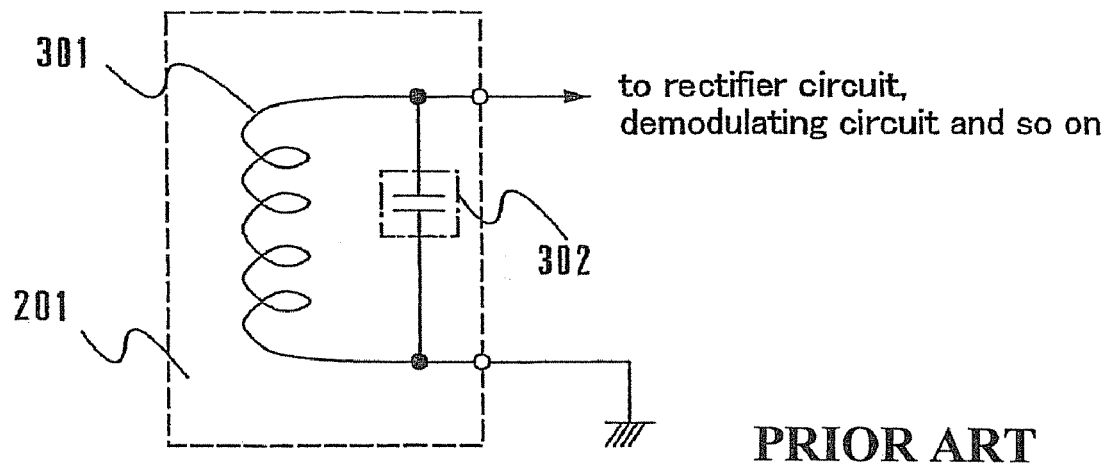
FIGS. 3A and 3B are block diagrams showing a configuration of the conventional semiconductor device.
Figure 3B:
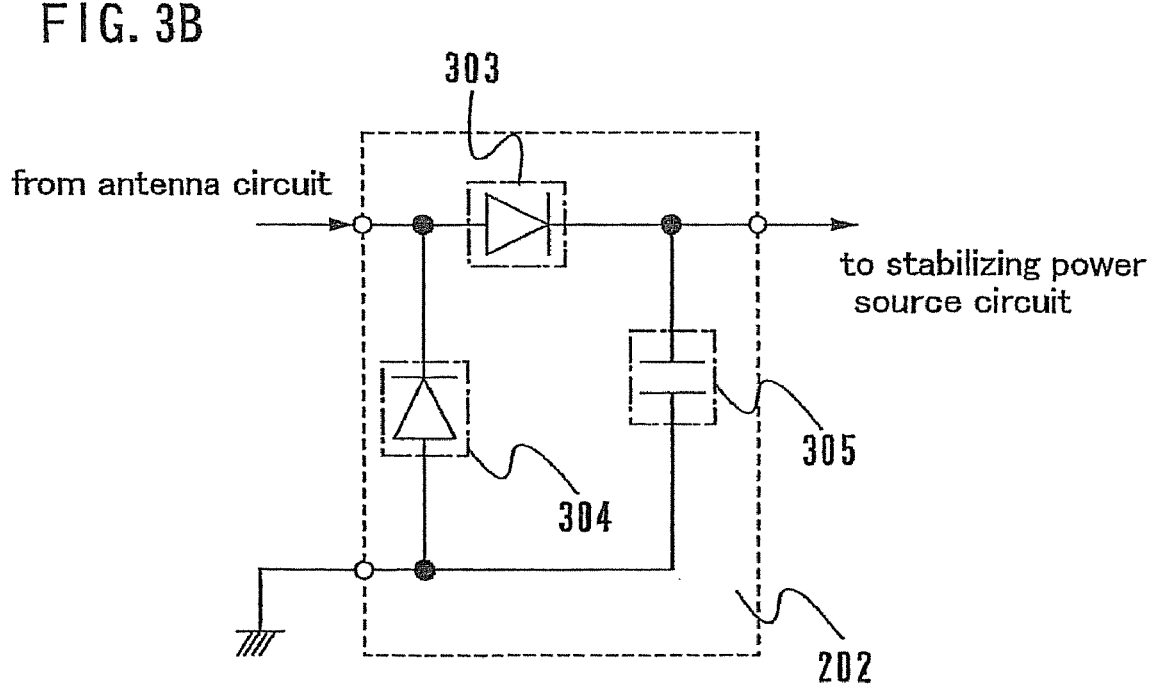
Figure 4:
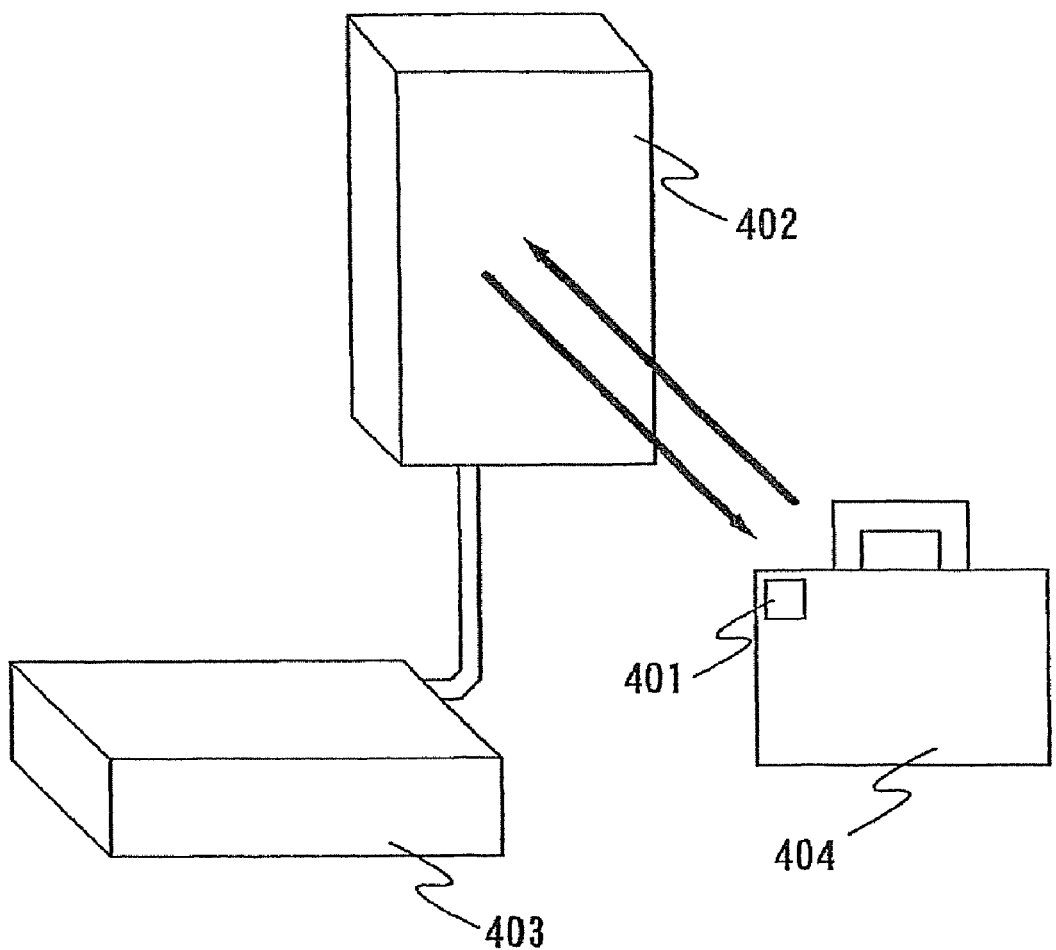
FIG. 4 is a diagram showing an overview of an RF tag system.

FIG. 1 shows a first embodiment mode of the invention. A semiconductor device 100 used for an ID chip includes an antenna circuit 101, a voltage detecting circuit 102, a current amplifier circuit 103, a signal processing circuit 104, and a fuse 105. Note that the antenna circuit 101 can be similar to the one shown in FIG. 3A. The signal processing circuit 104 is similar to the one shown in FIG. 2 that is a conventional technology. In this embodiment mode, although the antenna circuit is formed over the semiconductor device 100, the invention is not limited to this and the antenna circuit may be connected externally to the semiconductor device.

An operation of the ID chip is described below. A signal received from the interrogator is, generally, sent from the antenna circuit 101 to the signal processing circuit 104 to be demodulated. However, in FIG. 1, the voltage detecting circuit 102, the current amplifier circuit 103, and the fuse 105 are additionally provided between the antenna circuit 101 and the signal processing circuit 104. A signal received by the antenna circuit 102 is inputted to the voltage detecting circuit 102. Then, if a voltage larger than a certain threshold voltage is applied, the voltage detecting circuit 102 outputs a detection signal to input to the current amplifier circuit 103. When the detection signal is inputted, the current amplifier circuit 103 supplies a large current from a power source terminal. The fuse 105 is provided in a pathway of a power source, which is melted down due to self-heating when a large current flows therethrough.

A power source is not supplied to the signal processing circuit 104 if the fuse 105 is melted down. Therefore, the semiconductor device 100 loses its function of an ID chip after the meltdown. In this manner, by applying a large signal enough to melt down the fuse 105 to the antenna after the function of the ID chip is completed, for example, when the consumers' purchase is completed or after the certificate expires, the consumers' privacy can be protected or abuse after lapse of the certificate can be prevented according to the semiconductor device in this embodiment mode.

Figure 8:
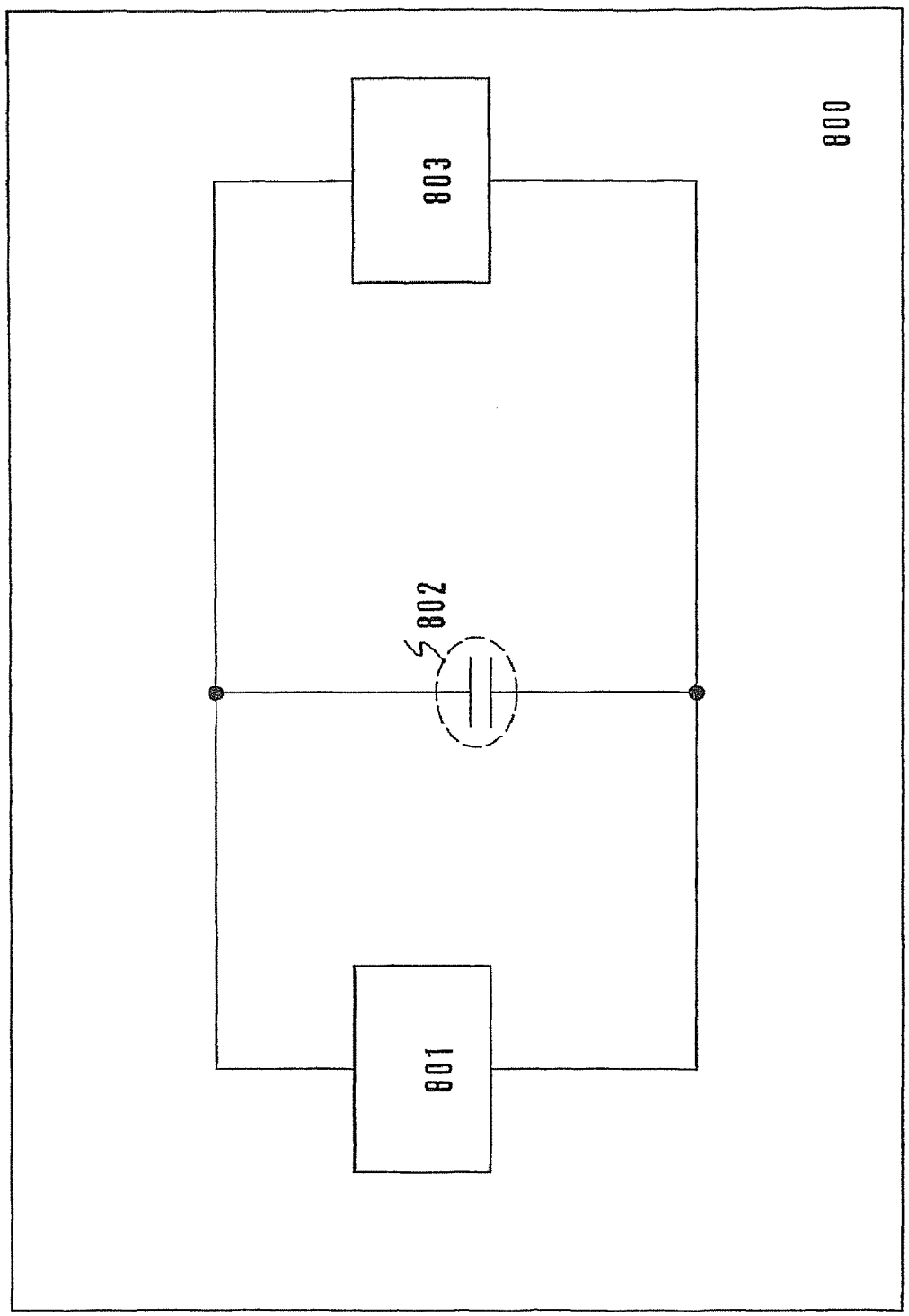
FIG. 8 is a diagram showing an embodiment mode using a capacitive anti-fuse element.

FIG. 8 shows a second embodiment mode of the invention. In this embodiment mode, an anti-fuse capacitor 802 is connected between an antenna circuit 801 and a signal processing circuit 803. When a high voltage is applied to the antenna circuit 801, the high voltage is also applied to the anti-fuse capacitor 802. When the voltage is higher than a withstand voltage of the anti-fuse capacitor 802, the anti-fuse capacitor 802 is shorted.

A power source is not supplied to the signal processing circuit 803 if the anti-fuse capacitor 802 is shorted. Therefore, a semiconductor device 800 loses its function of an ID chip after the short. In this manner, by applying a signal large enough to short the anti-fuse capacitor 802 to the antenna after the function of the ID chip is completed, for example, when the consumers' purchase is completed or after the certificate expires, the consumers' privacy can be protected or abuse after lapse of the certificate can be prevented according to the semiconductor device in this embodiment mode.

Figure 9:
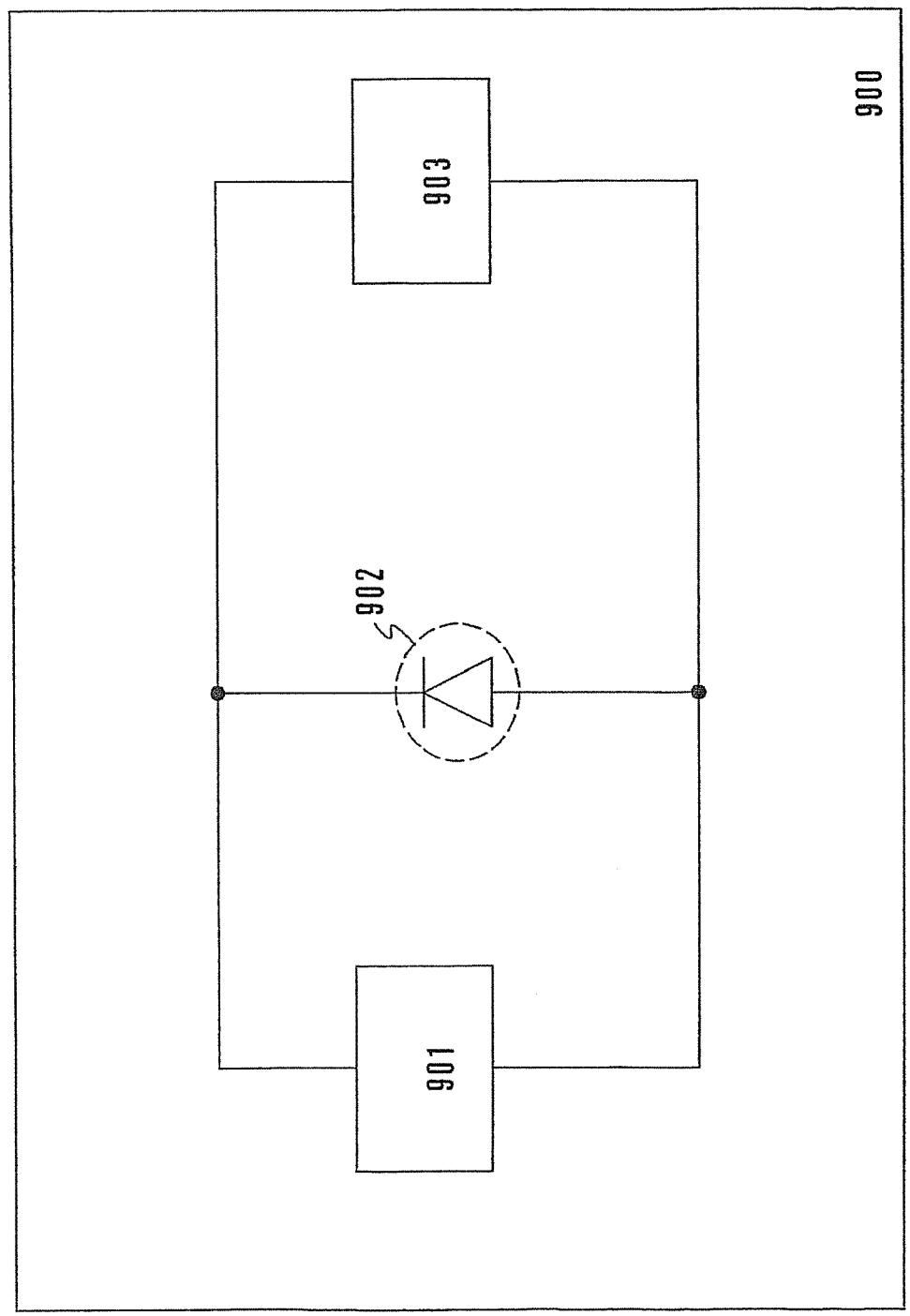
FIG. 9 is a diagram showing an embodiment mode using a diode anti-fuse element.

FIG. 9 shows a third embodiment mode of the invention. In this embodiment mode, an anti-fuse diode 902 is connected between an antenna circuit 901 and a signal processing circuit 903. When a high voltage is applied to the antenna circuit 901, the high voltage is also applied to the anti-fuse diode 902. When the voltage is higher than a withstand voltage of the anti-fuse diode 902, the anti-fuse diode 902 is shorted.

A power source is not supplied to the signal processing circuit 903 if the anti-fuse diode 902 is shorted. Therefore, a semiconductor device 900 loses its function of an ID chip after the short. In this manner, by applying a signal large enough to short the anti-fuse diode 902 to the antenna after the function of the ID chip is completed, for example, when the consumers' purchase is completed or after the certificate expires, the consumers' privacy can be protected or abuse after lapse of the certificate can be prevented according to the semiconductor device in this embodiment mode.

Embodiment 1

Figure 6A:
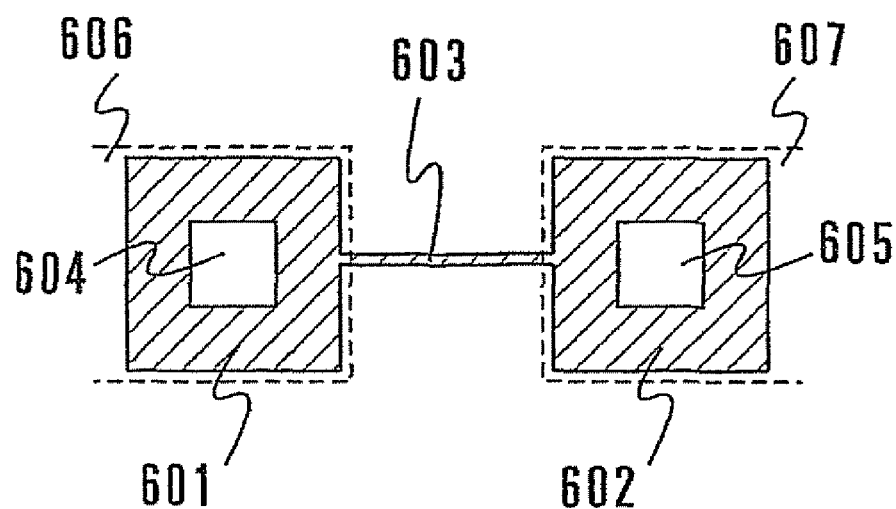
FIGS. 6A and 6B are diagrams each showing a structure of a fuse element.

An example of a fuse element is described with reference to FIG. 6A. The fuse element shown in FIG. 6A is used by melting down its metal wiring. A thin filamentary meltdown portion 603 is provided between an electrode 601 and an electrode 602 to connect the electrodes to each other. This fuse element connects a wiring 606 and a wiring 607 to each other. FIG. 6A is an example in which the fuse element and the wiring are connected through a contact hole 604 or 605 formed in an insulating film. As for the wiring material, a material for a gate electrode or a material for a source/drain electrode forming a thin film transistor (hereinafter a TFT) can be employed. In order to melt down with less heat generation, the width of the wiring is made as narrow as possible, and is preferably 1 μm or less.

Figure 6B:
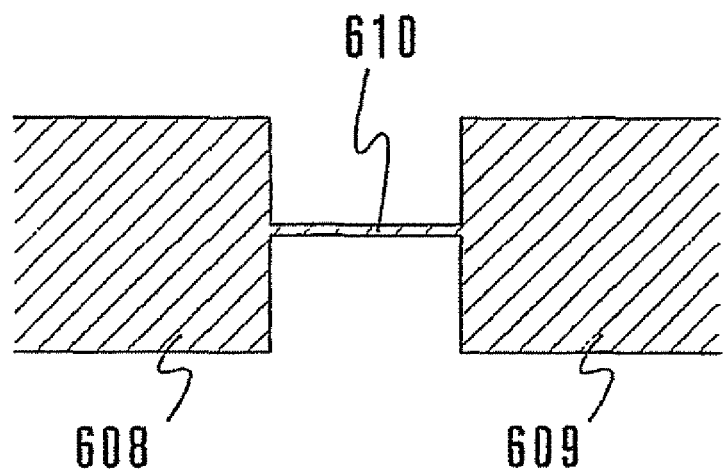

Next, a fuse element using an island-shaped semiconductor region of a TFT is described with reference to FIG. 6B. The fuse element shown in FIG. 6B has a meltdown portion 610 between an electrode 608 and an electrode 609 to connect the electrodes to each other. The electrode 608, the electrode 609, and the meltdown portion 610 are formed using a semiconductor. To this semiconductor which flows a large amount of current, a large amount of an N-type or P-type impurity is preferably added to suppress a resistance value thereof. In order to melt down with less heat generation, the width of the wiring is made as narrow as possible, and is preferably 1 μm or less.

Figure 13:
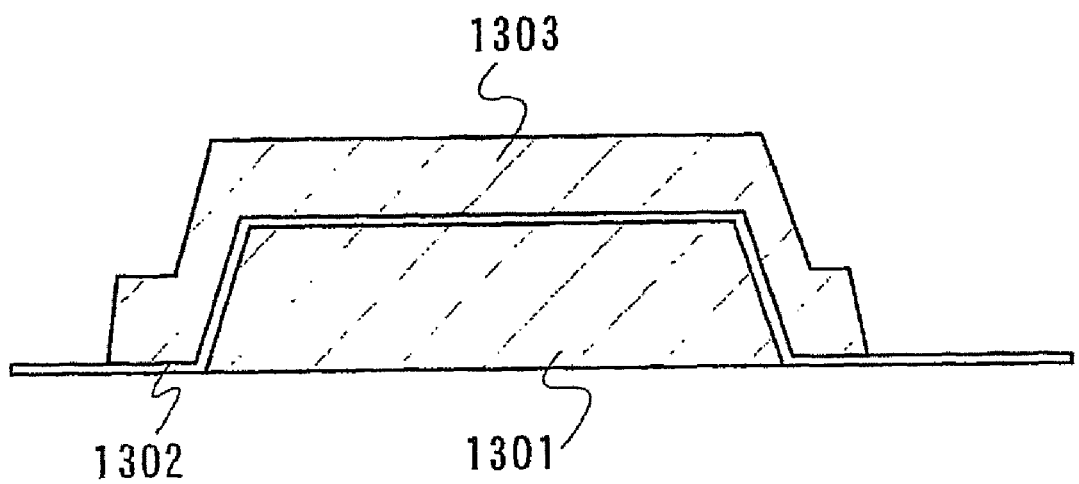
FIG. 13 is a view showing a structure of a capacitive anti-fuse element.

A structure of an anti-fuse using a capacitor is shown in FIG. 13. The anti-fuse serves as a capacitor and is open with respect to a direct current at the initial stage. By applying a high voltage, both terminals thereof are shorted. This is an anti-fuse element in which a first conductive layer 1301 and a second conductive layer 1303 are provided on both sides of an insulating film 1302, which is shorted by breaking the insulating film by applying a high voltage between the two conductive layers. According to this embodiment, the aforementioned second embodiment mode can be implemented.

Figure 14:
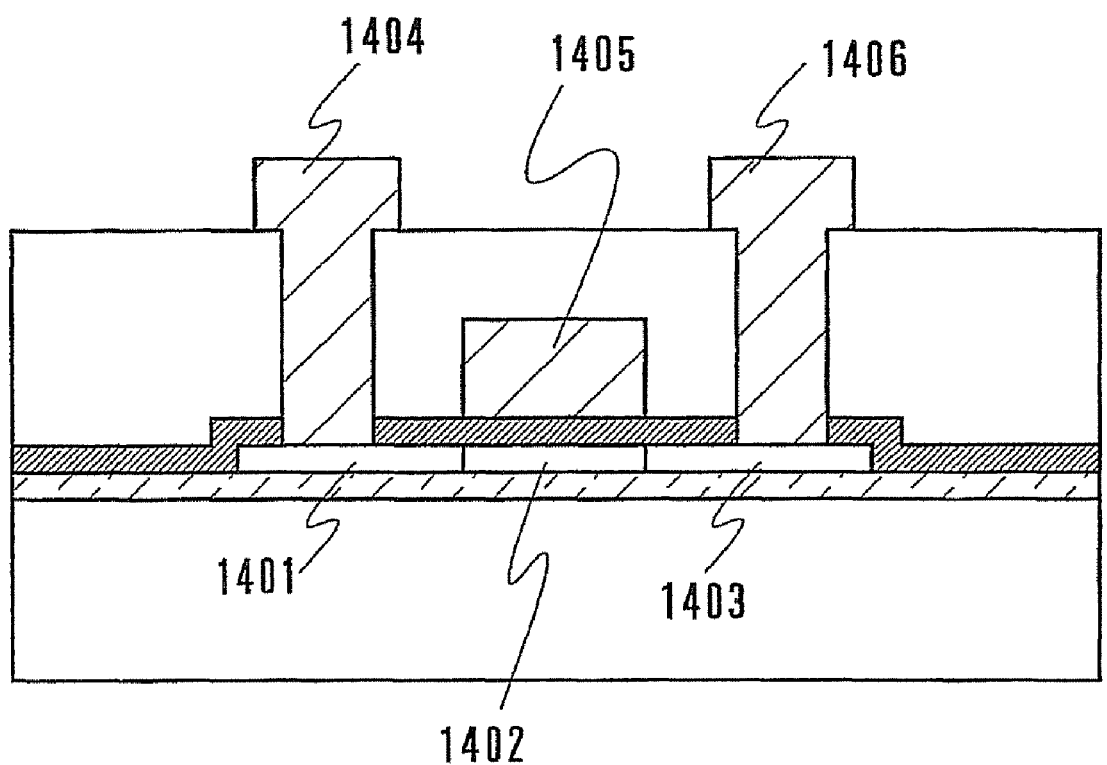
FIG. 14 is a view showing a structure of a diode anti-fuse element.

An anti-fuse element shown in FIG. 14 uses a diode. At the initial stage, the anti-fuse element is applied with a reverse bias and is open with respect to a direct current. By applying a high voltage, both terminals thereof are shorted. This is an anti-fuse element which is shorted by breaking an I-type region 1402 under a gate 1405 by applying a high voltage between a cathode 1404 connected to an N-type impurity region 1401 and an anode 1406 connected to a P-type impurity region 1403. According to this embodiment, the aforementioned third embodiment mode can be implemented.

Embodiment 2

Figure 5:
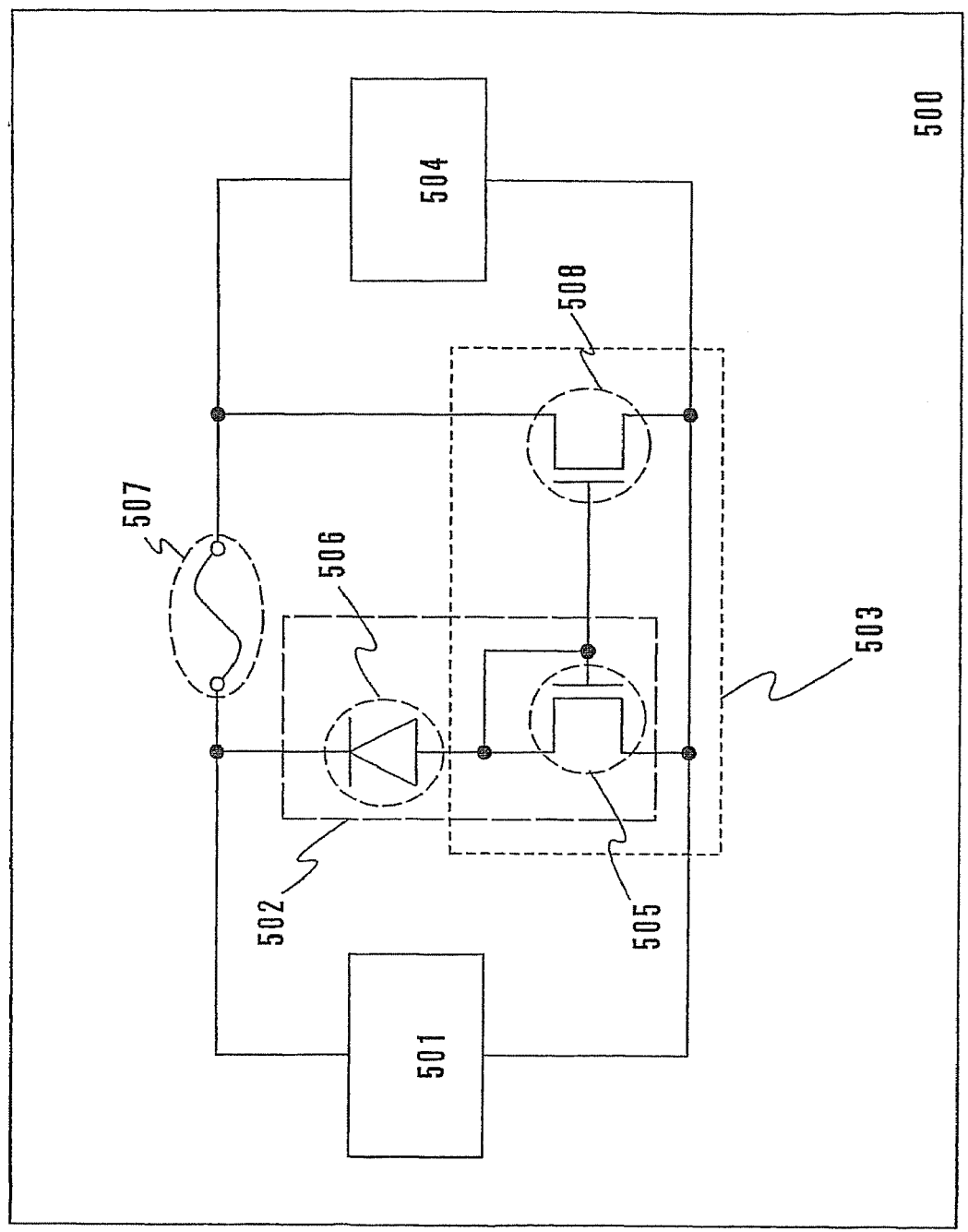
FIG. 5 is a diagram showing an embodiment using a current mirror circuit.

In a semiconductor device shown in FIG. 5, a voltage detecting circuit 502 is configured by a diode 506, and a current amplifier circuit 503 is configured by a TFT 505 and a TFT 508. The TFT 505 and the TFT 508 constitute a current mirror circuit. An operation thereof is described below. A signal received by an antenna circuit 501 is inputted to the voltage detecting circuit 502. The diode 506 is applied with a reverse bias, and no current flows therethrough with a voltage lower than a breakdown voltage thereof. When the received signal exceeds the breakdown voltage, a current flows through the diode 506.

By designing the gate width of the TFT 508 to be n times as wide as that of the TFT 505, a current n times as large as a current flowing to the diode 506 can be flown to the TFT 508. By increasing the value n as much as possible, a drain current of the TFT 508 can be increased and a fuse 507 can be melted down.

In this manner, by supplying a large signal to the antenna circuit 501, a power source or a signal cannot be supplied to the signal processing circuit 504. Then, a semiconductor device 500 cannot function as an ID chip.

Embodiment 3

Figure 7:
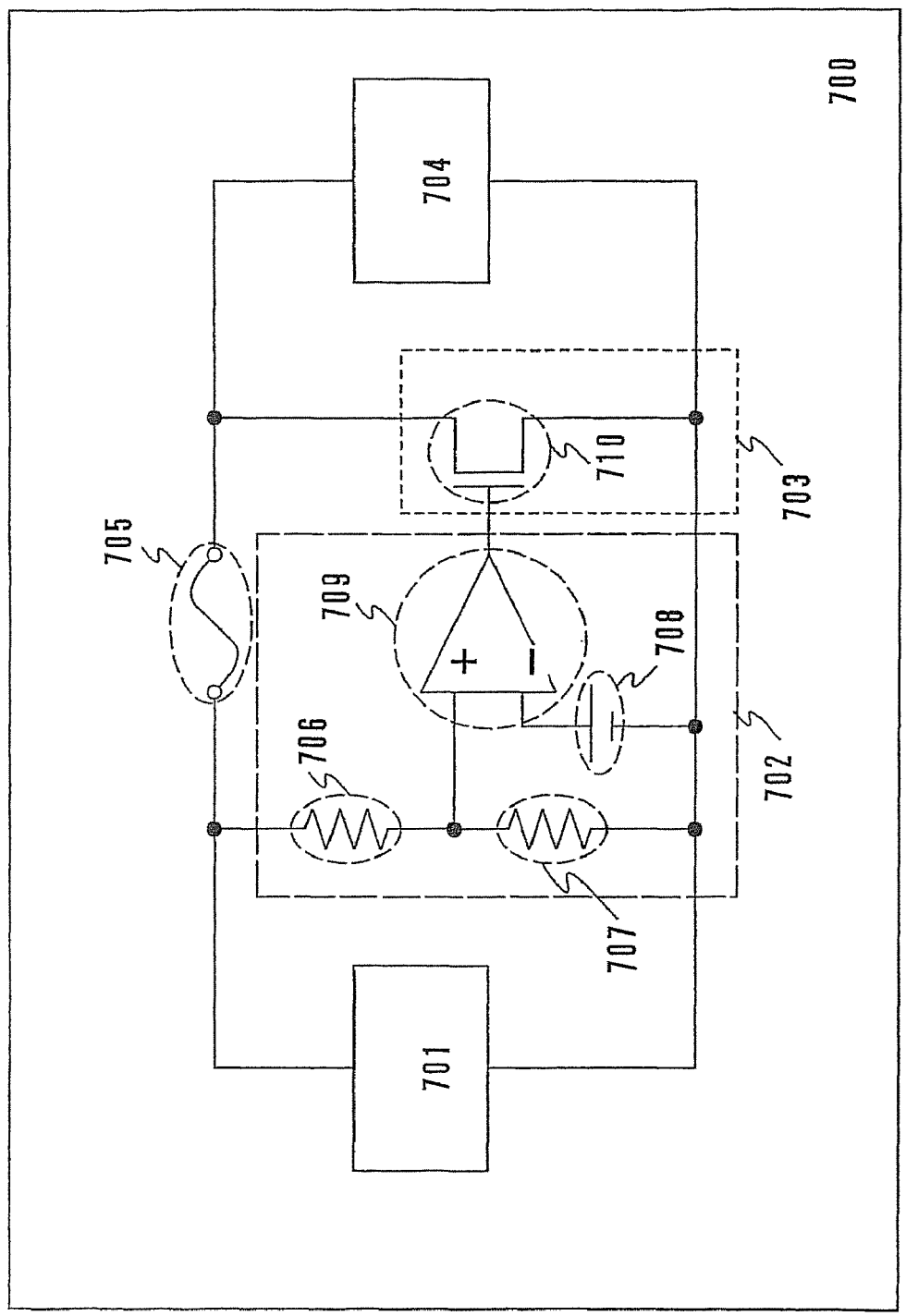
FIG. 7 is a diagram showing an embodiment using a comparator circuit.

FIG. 7 is an embodiment using a comparator, in which a voltage detecting circuit 702 is configured by resistors 706 and 707, a comparator 709, and a voltage source 708. A signal inputted to an antenna circuit 701 is inputted to the resistor 706. The resistor 706 is connected to the resistor 707 and a non-inverting terminal of the comparator 709, and a signal of the antenna circuit 701 is voltage-divided by the resistor 706 and the resistor 707. On the other hand, an inverting input terminal of the comparator 709 is inputted with the voltage source 708 so that a potential of the voltage source 708 and a potential made by the resistors 706 and 707 are compared to each other. When the potential made by the resistors 706 and 707 exceeds the potential of the voltage source 708, a TFT 710 operates to flow a drain current thereof. The TFT 710 functions as a current amplifier circuit 703. If the drain current of the TFT 710 is large, a fuse 705 can be melted down.

In this manner, by supplying a large signal to the antenna circuit 701, a power source or a signal cannot be supplied to a signal processing circuit 704. Then, a semiconductor device 700 cannot function as an ID chip.

Embodiment 4

Figure 20:
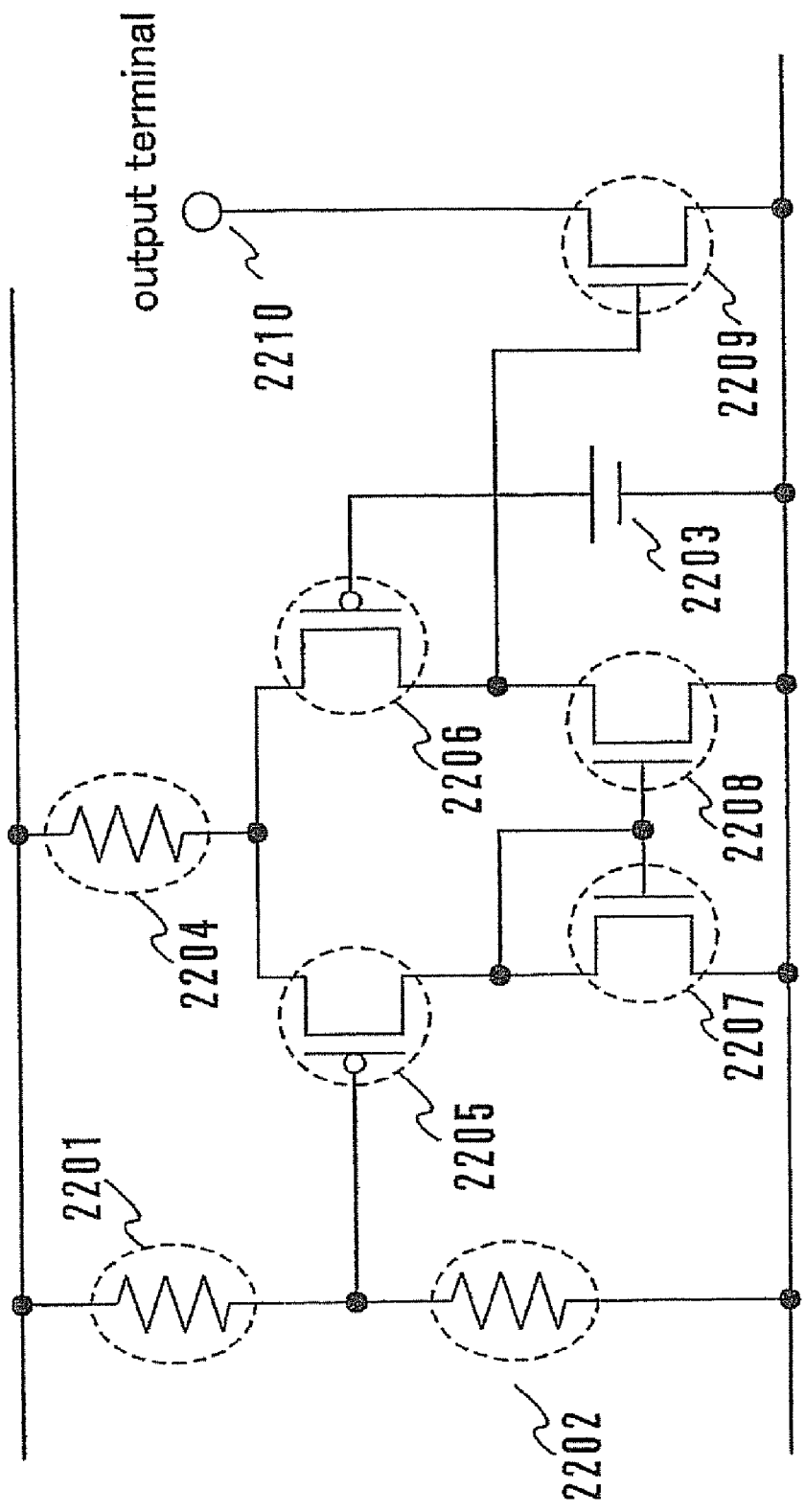
FIG. 20 is a diagram showing an example of a comparator circuit of the invention.

An example of a comparator circuit is described with reference to FIG. 20. The comparator circuit is constituted by a differential circuit and a current mirror circuit. The differential circuit is configured by a transistor 2205, a transistor 2206, and a current supply resistor 2204. The current mirror circuit is configured by transistors 2207 and 2208.

When a gate potential of the transistor 2205 connected to the resistors 2201 and 2202 is higher than that of the transistor 2206 connected to a power source 2203, the amount of current flowing to the transistor 2206 becomes larger than that of the transistor 2205, leading to increase a gate potential of a transistor 2209. Consequently, a current flows to an output terminal 2210. Here, if the size of the transistor 2209 is large enough and a fuse is connected to the output terminal 2210, the fuse can be melted down by the output current of the transistor 2209. In this manner, according to this embodiment, the aforementioned first embodiment mode can be implemented. A comparator circuit used in the invention is not limited to this, and another type of circuit may be used.

Embodiment 5

A method for manufacturing a memory element, and TFTs used for a logic circuit portion such as a decoder, a selector, a write circuit, and a read circuit over an insulating substrate at the same time is described with reference to FIG. 15. It is to be noted that an n-channel memory element having a floating gate, an n-channel TFT, and a p-channel TFT are described as examples of a semiconductor element in this embodiment, however, the semiconductor element included in the memory portion and logic circuit portion of the invention is not limited to these. Further, this manufacturing method is only an example and does not limit a manufacturing method over an insulating substrate.

First, base films 3001 and 3002 are formed using an insulating film such as a silicon oxide film, a silicon nitride film, or a silicon oxynitride film on an insulating substrate 3000. For example, a silicon nitride film is formed as the base film 3001 with a thickness of 10 to 200 nm, and a silicon oxide film is formed as the base film 3002 with a thickness of 50 to 200 nm in this order. Further, a silicon nitride film may be formed with a thickness of 1 to 5 nm on the silicon oxide film.

Island-shaped semiconductor layers 3003 to 3005 are formed using crystalline semiconductor films formed by crystallizing a semiconductor film having an amorphous structure by laser or thermal annealing. Each of these island-shaped semiconductor layers 3003 to 3005 is formed with a thickness of 25 to 80 nm. A material for the crystalline semiconductor film is not particularly limited, however, silicon or silicon germanium (SiGe) is preferable.

Here, a process for providing an overlapping region may be carried out for extracting a charge on one side of a source region or a drain region of the island-shaped semiconductor layer 3003 of a TFT used for the memory element.

Subsequently, a gate insulating film 3006 to cover the island-shaped semiconductor layers 3003 to 3005 is formed. The gate insulating film 3006 is formed using an insulating film containing silicon with a thickness of 10 to 80 nm by plasma CVD or sputtering. In particular, in the case of an OTP type nonvolatile memory which requires writing by hot electron injection and holding of a charge, the gate insulating film is preferably formed with a thickness of 40 to 80 nm with which a tunnel current does not easily flow.

Then, first conductive layers 3007 to 3009 are formed on the gate insulating film 3006 and removed by etching except for a region to be a floating gate electrode and regions to be gate electrodes of normal TFTs.

Subsequently, a second gate insulating film 3010 is formed. The second gate insulating film 3010 is formed using an insulating film containing silicon with a thickness of 10 to 80 nm by plasma CVD or sputtering. The second gate insulating film 3010 is removed by etching except for a region to form the memory element.

Then, second conductive layers 3011 to 3013 are formed and a stack (the memory element) of the first conductive layer 3007, the second gate insulating film 3010, and the second conductive layer 3011, a stack (the normal TFT) of the first conductive layer 3008 and the second conductive layer 3012, and a stack (the normal TFT) of the first conductive layer 3009 and the second conductive layer 3013 are etched altogether to form a floating gate electrode and a control gate electrode of the memory element, and gate electrodes of the normal TFTs.

In this embodiment, the first conductive layers 3007 to 3009 are formed using titanium nitride with a thickness of 50 to 100 nm and the second conductive layers 3011 to 3013 are formed using tungsten with a thickness of 100 to 300 nm, however, the material for each conductive layer is not particularly limited. An element selected from Ta, W, Ti, Mo, Al, Cu, and the like, an alloy material or a compound material containing the aforementioned element as a main component may be used as well.

Subsequently, doping is carried out for imparting n-type conductivity to the TFT used for the memory element, thereby first impurity regions 3014 and 3015 are formed. Next, doping is carried out for imparting p-type conductivity to a p-channel TFT used in the logic circuit portion, thereby second impurity regions 3016 and 3017 are formed. Subsequently, doping is carried out for imparting n-type conductivity for forming a low concentration impurity (LDD) region of an n-channel used in the logic circuit portion, thereby third impurity regions 3018 and 3019 are formed. After that, side walls 3020 and 3021 are formed and doping is carried out for imparting n-type conductivity to the n-channel TFT used in the logic circuit portion, thereby fourth impurity regions 3022 and 3023 are formed. These doping may be carried out by ion doping (impurity ions are not mass-separated) or ion injection (impurity ions are mass-separated) by which impurity ions for controlling valence electrons are accelerated in the electric field and added to the semiconductor layer. By the aforementioned steps, impurity regions are formed in each of the island-shaped semiconductor layers.

Then, a first interlayer insulating film 3024 is formed using a silicon oxynitride film. The first interlayer insulating film 3024 is formed with a thickness of 10 to 80 nm which is approximately the same thickness as the gate insulating film 3006. Next, a step for hydrogenating the island-shaped semiconductor layer is carried out by diffusing hydrogen contained in the silicon oxynitride film. Thermal treatment in the hydrogenation is, for example, carried out by heating at 450 to 650° C. by rapid thermal annealing. This hydrogenation step also enables activation of the impurity element added to each island-shaped semiconductor layer.

Subsequently, a second interlayer insulating film 3025 is formed using an organic insulating material such as acrylic. Further, an inorganic material can be used for the second interlayer insulating film 3025 instead of using an organic insulating material. As the inorganic material, inorganic $SiO_2$, $SiO_2$ formed by plasma CVD, SOG (Spin On Glass; coated silicon oxide film) or the like is used. An etching step for forming a contact hole is performed after forming the two interlayer insulating films.

Then, electrodes 3026 and 3027 are formed to contact to a source region and drain region of the island-shaped semiconductor layer in the memory portion. In the logic circuit portion as well, electrodes 3028 to 3030 are formed.

Figure 15:
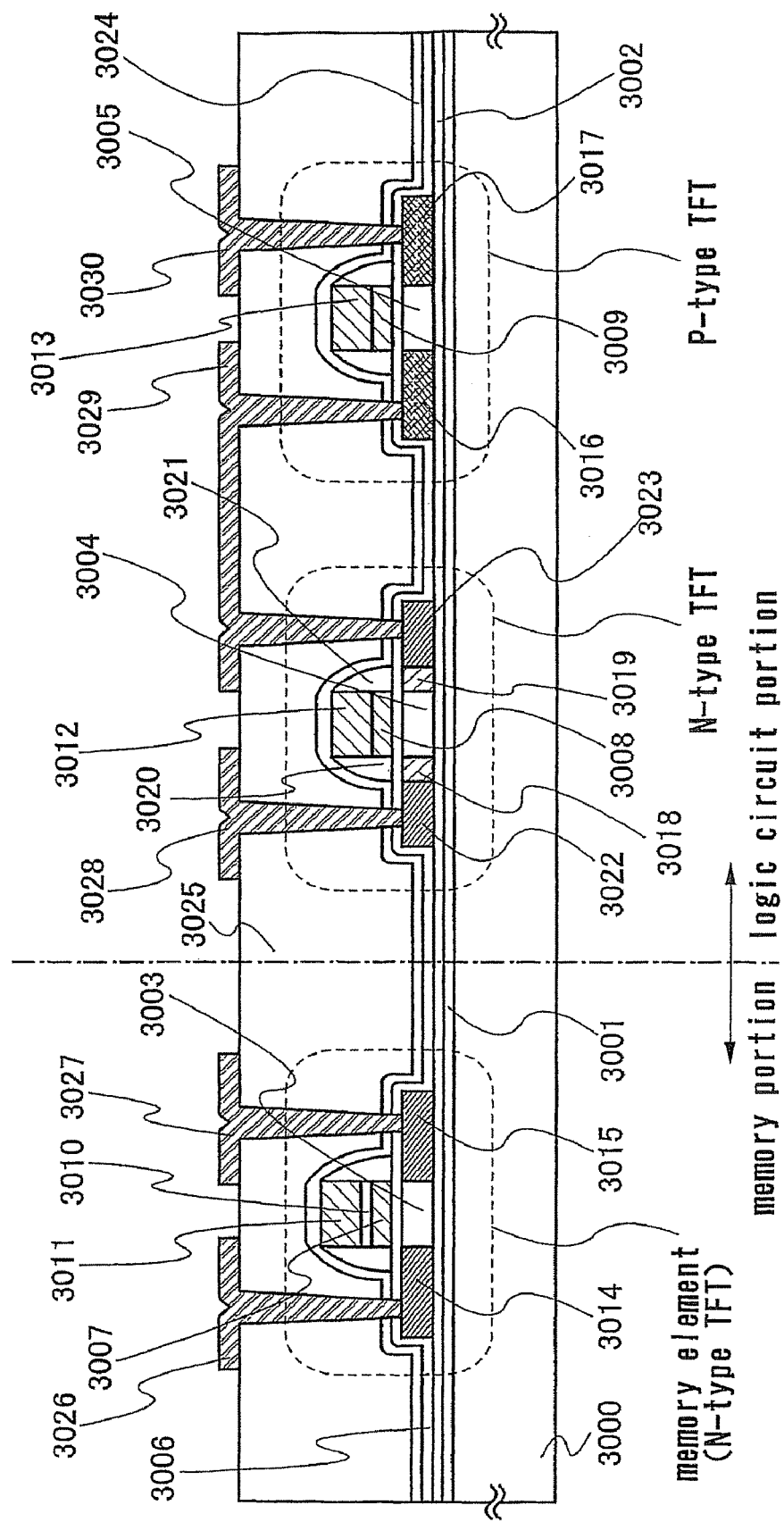
FIG. 15 is a cross-sectional view at a step of the invention.

In this manner, the memory portion including an n-channel memory element having a floating gate and the logic circuit portion including an n-channel TFT having an LDD structure and a p-channel TFT having a single-drain structure can be formed over the same substrate as shown in FIG. 15.

In this embodiment also, a manufacturing method of a case where a memory portion and a logic circuit portion are formed and then transferred to a flexible substrate is described with reference to FIGS. 16A to 17B. It is to be noted that an n-channel memory element having a floating gate, an n-channel TFT, and a p-channel TFT are taken as an examples, however, a semiconductor element included in the memory portion and logic circuit portion of the invention is not limited to these. Further, this manufacturing method is only an example and does not limit a manufacturing method over an insulating substrate.

A peeling layer 4000 is formed on the insulating substrate 3000. The peeling layer 4000 can be formed using a layer containing silicon as a main component such as amorphous silicon, polycrystalline silicon, single crystalline silicon, and microcrystalline silicon (including semi-amorphous silicon). The peeling layer 4000 can be formed by sputtering, plasma CVD or the like. In this embodiment, an amorphous silicon film is formed with a thickness of about 500 nm by sputtering as the peeling layer 4000. Subsequently, the memory portion and logic circuit portion as shown in FIG. 15 are formed according to the above-described manufacturing steps.

Subsequently, a third interlayer insulating film 4001 is formed on the second interlayer insulating film 3025, and pads 4002 to 4005 are formed. The pads 4002 to 4005 can be formed using a conductive material containing one or a plurality of metals such as Ag, Au, Cu, Pd, Cr, Mo, Ti, Ta, W, and Al, or a metal compound thereof.

Then, a protective layer 4006 is formed over the third interlayer insulating film 4001 so as to cover the pads 4002 to 4005. The protective layer 4006 is formed using a material capable of protecting the pads 4002 to 4005 when removing the peeling layer 4000 by etching. For example, the protective layer 4006 can be formed by applying an epoxy-based, acrylate-based, or silicon-based resin which is soluble to water or alcohols to the entire surface (FIG. 16A).

Next, a groove 4007 for separating the peeling layer 4000 is formed (see FIG. 16B). The groove 4007 may be formed at least to expose the peeling layer 4000. The groove 4007 can be formed by etching, dicing, scribing or the like.

Subsequently, the peeling layer 4000 is removed by etching (see FIG. 17A). In this embodiment, halogen fluoride is used as an etching gas which is inlet through the groove 4007. In this embodiment, for example, the etching is performed by using $ClF_3$ (chlorine trifluoride) at 350° C. at a flow rate of 300 sccm at a pressure of 800 Pa (6 Torr) for 3 hours. Further, a $ClF_3$ gas mixed with nitrogen may be used as well. By using halogen fluoride such as $ClF_3$, the peeling layer 4000 is selectively etched to peel off the insulating substrate 3000. It is to be noted that the halogen fluoride may be a gas or liquid.

Subsequently, the memory portion and the logic circuit portion which are peeled off are attached to a support base 4009 with an adhesive 4008 (see FIG. 17B). A material which can attach the support base 4009 and the base film 3001 to each other is used for the adhesive 4008. For example, various curable adhesives such as a reaction curable adhesive, a heat curable adhesive, an optical curable adhesive such as an ultraviolet curable adhesive, and an anaerobiotic adhesive can be used as the adhesive 4008.

As the support base 4009, an organic material such as a flexible paper or plastic can be used. Alternatively, a flexible inorganic material may be used as the support base 4009. The support base 4009 may also be formed by a composite of an inorganic material and an organic material by attaching a glass board with a thickness of 0.1 to 0.5 mm and an organic resin film with a thickness of about 10 to 100 μm. It is preferable that the support base 4009 have high heat conductivity of about 2 to 30 W/mK for dispersing heat generated in the integrated circuit.

It is to be noted that the integrated circuit including the memory portion and the logic circuit portion may be peeled off the insulating substrate 3000 by various methods as well as by etching a silicon film as described in this embodiment. For example, a metal oxide film is provided between a substrate having high heat resistance and the integrated circuit and the metal oxide film is made vulnerable by crystallization to peel off the integrated circuit. Further, for example, the peeling layer is broken by laser light irradiation to peel the integrated circuit off the substrate. Further, for example, the integrated circuit can be peeled off the substrate by mechanically removing the substrate over which the integrated circuit is formed or removing by etching with a solution or a gas.

In the case where an object has a curved surface and thus a support base of an ID chip attached thereto is bent so as to have a curvature along a generating line of a conical surface, a columnar surface and the like, it is preferable that the direction of the generating line and a direction that carriers of a TFT move be the same. By the aforementioned structure, characteristics of the TFT can be prevented from being affected if the support base is bent. Further, by forming the island-shaped semiconductor film to occupy 1 to 30% of an area of the integrated circuit, it can further be prevented that the characteristics of the TFT are affected if the support base is bent. This embodiment can be implemented in combination with the aforementioned embodiment modes and the other embodiments.

Embodiment 6

Figure 21A:
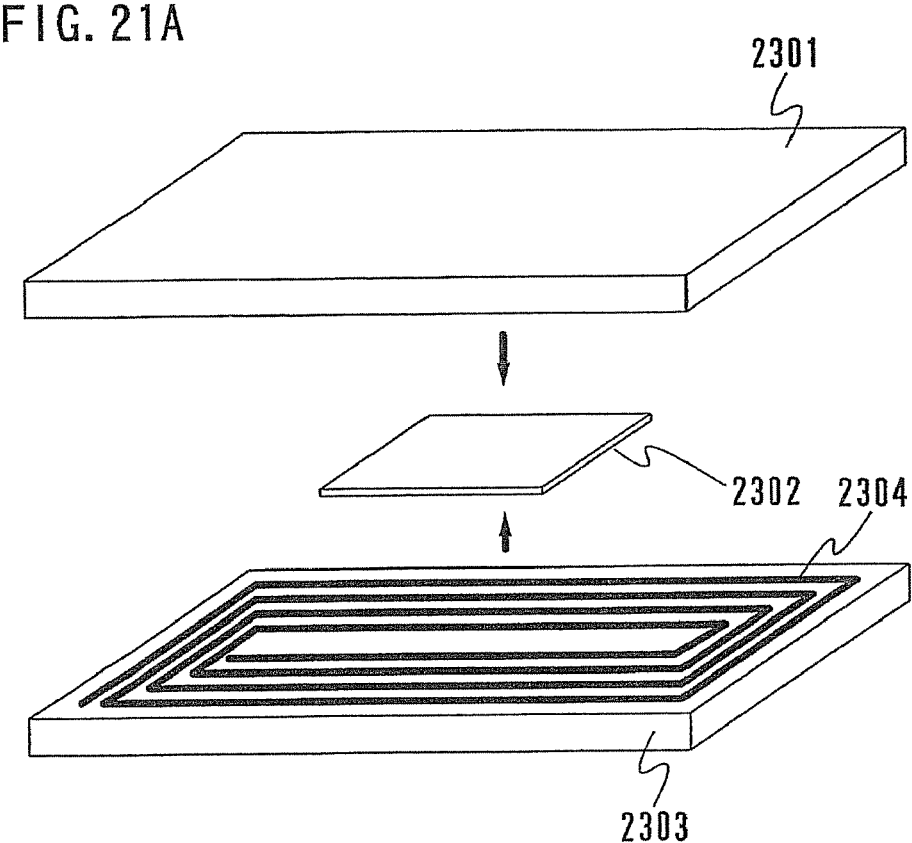
FIGS. 21A and 21B are diagrams of a semiconductor device of the invention which is combined with a protective layer.

An example of forming a flexible ID tag by a peeling process is described with reference to FIGS. 21A and 21B. The ID chip is structured by flexible protective layers 2301 and 2303, and an ID chip 2302 formed by using a peeling process. In this embodiment, an antenna 2304 is not formed over the ID chip 2302 but over the protective layer 2303 and is electrically connected to the ID chip 2302. In FIG. 21A, the antenna is formed only over the flexible protective layer 2303, however, the antenna may be formed over the flexible protective layer 2301 as well. The antenna is preferably formed using silver, copper, or a metal plated with them. The ID chip 2302 and the antenna are connected with an anisotropic conductive film by UV treatment, however, the invention is not limited to this connection method.

Figure 21B:
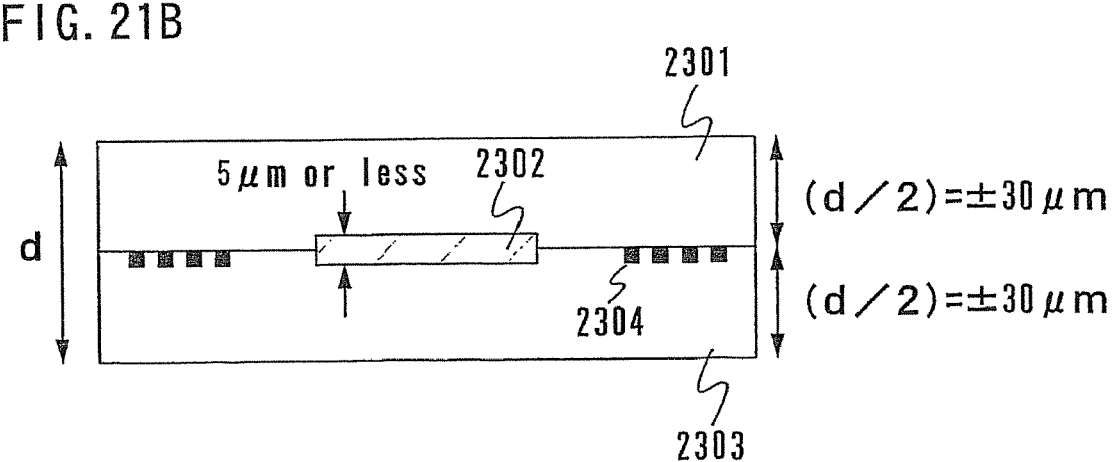

FIG. 21B shows a cross section of FIG. 21A. The ID chip 2302 has a thickness of 5 μm or less, and desirably 0.1 to 3 μm. Further, each of the protective layers 2301 and 2303 preferably has a thickness of (d/2)±30 μm and more preferably (d/2)±10 μm given that the thickness of a stack of the protective layers 2301 and 2303 is d. It is preferable that the protective layers 2301 and 2303 have a thickness of 10 to 200 μm. The ID chip 2302 has an area of 5 mm square or smaller, and preferably 0.3 to 4 mm square.

Each of the protective layers 2301 and 2303 is formed using an organic resin material and has a structure having high resistance against bending. Since the ID chip 2302 itself formed by a peeling process is also highly resistant against bending compared to a single crystalline semiconductor, it can be closely attached to the protective layers 2301 and 2303. The ID chip surrounded by the protective layers 2301 and 2303 may be provided over the surface of another object or inside thereof. Alternatively, it may be embedded into paper.

Embodiment 7

Figure 19:
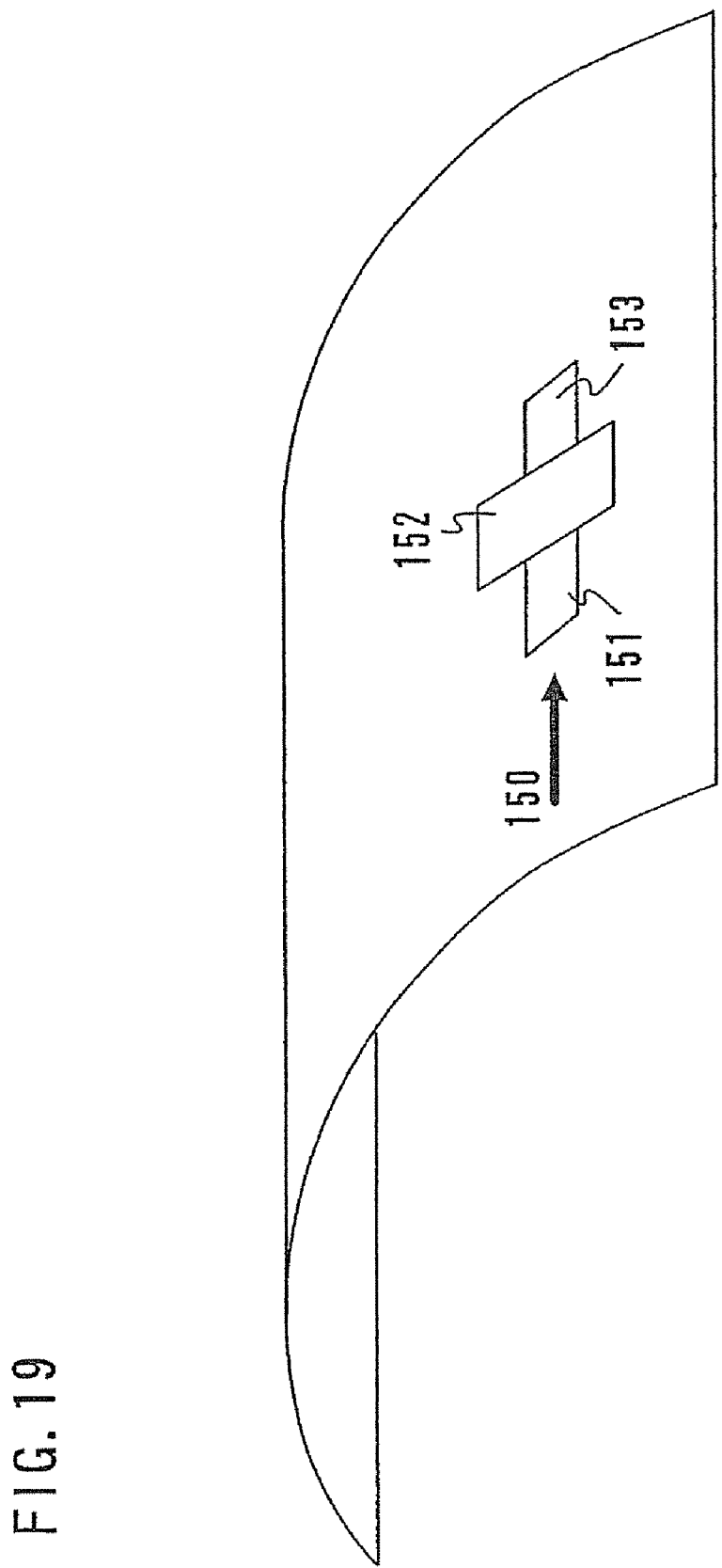
FIG. 19 is a diagram showing an arrangement of a TFT according to the invention.

Described with reference to FIG. 19 is the case where an ID chip is attached to a curved surface, that is, the case where a TFT is arranged perpendicularly to a curving direction of the ID chip. A TFT included in the ID chip of FIG. 19 is arranged in a direction of current flow 150, that is, a drain electrode 151, a gate electrode 152, and a source electrode 153 thereof are arranged linearly so as to suppress an effect of pressure. With such an arrangement, variations in characteristics of the TFT can be suppressed. Further, crystals which form the TFT are aligned in the direction of current flow 150. By forming the crystals using CWLC and the like, the S value can be 0.35 V/dec or lower (preferably 0.09 to 0.25 V/dec) and the mobility can be 100 cm$^2$/Vs or higher. In the case of forming a 19-stage ring oscillator using such TFTs, an oscillating frequency thereof is 1 MHz or higher, and preferably 100 MHz or higher with a power source voltage of 3 to 5 V. With the power source voltage of 3 to 5 V, delay time of one stage of an inverter is 26 ns, and preferably 0.26 ns or less.

Further, it is desirable that an active region (silicon island portion) of an active element such as a TFT occupy 5 to 50% of an entire area in order not to break the active element due to stress. In a region where the active element such as a TFT does not exist, a base insulating material, an interlayer insulating material and a wiring material are mainly provided. It is preferable that an area except for the active region of the TFT be 60% or larger of an entire area. The active region of the active element has a thickness of 20 to 200 nm, typically 40 to 170 nm, and preferably 45 to 55 nm or 145 to 155 nm.

Embodiment 8

In this embodiment, examples of the case where an external antenna is provided to a circuit using the invention are described with reference to FIGS. 10A to 11C.

Figure 10A:
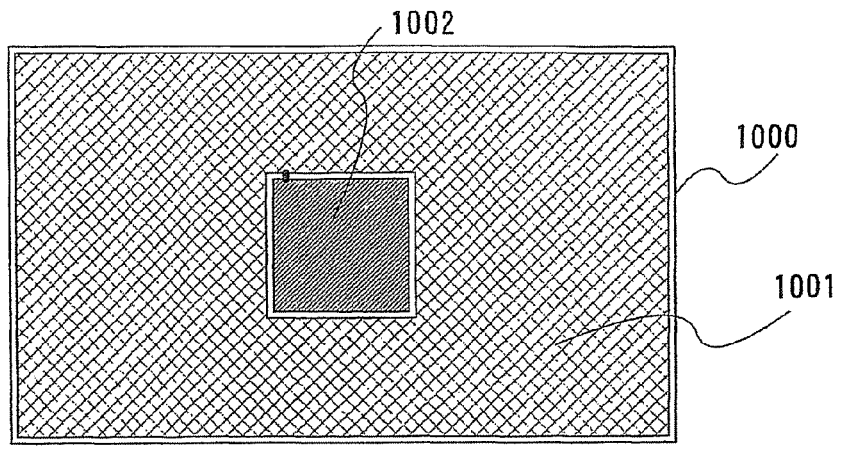
FIGS. 10A to 10E are diagrams each showing an embodiment of an antenna of the invention.

FIG. 10A shows a circuit of which periphery is covered with an antenna. An antenna 1001 is formed over a substrate 1000 and a circuit 1002 using the invention is connected thereto. In FIG. 10A, the antenna 1001 covers the periphery of the circuit 1002, however, the antenna may cover the entire substrate and the circuit 1002 having electrodes may be attached thereto.

Figure 10B:
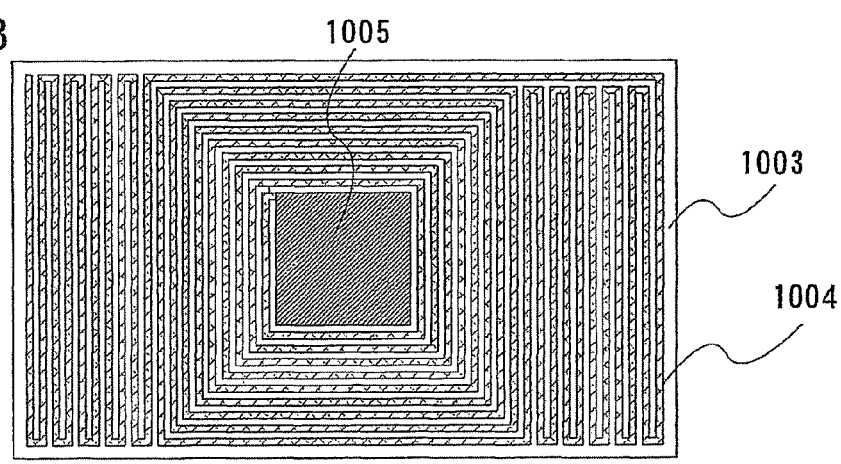

FIG. 10B shows a thin antenna arranged around a circuit. An antenna 1004 is formed over a substrate 1003 and a circuit 1005 using the invention is connected thereto. Is it to be noted that the wiring of antenna is only an example and the invention is not limited to this.

Figure 10C:
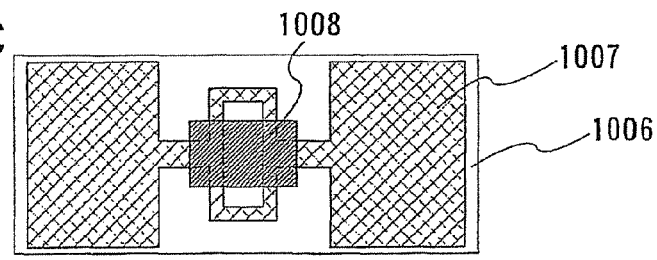

FIG. 10C shows a high frequency antenna. An antenna 1007 is formed over a substrate 1006 and a circuit 1008 using the invention is connected thereto.

Figure 10D:
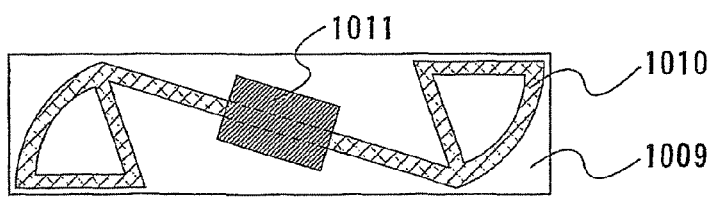

FIG. 10D shows a 180° omnidirectional antenna (capable of receiving signals from any directions). An antenna 1010 is formed over a substrate 1009 and a circuit 1011 using the invention is connected thereto.

Figure 10E:
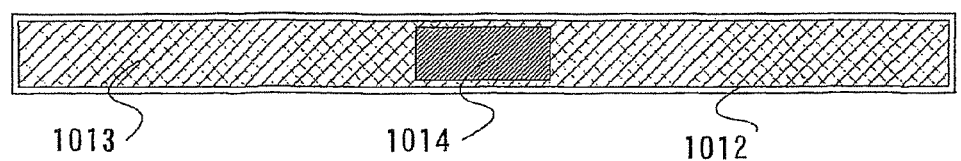

FIG. 10E shows an antenna extended in a stick shape. An antenna 1013 is formed over a substrate 1012 and a circuit 1014 using the invention is connected thereto.

A circuit using the invention and the above-described antenna can be connected by a known method. For example, the antenna and the circuit are connected by wire bonding or bump bonding. Alternatively, the circuit in a chip having an electrode over an entire surface thereof may be attached to the antenna. In this method, an ACF (Anisotropic Conductive Film) can be used to attach.

An appropriate length required for the antenna varies depending on a frequency for receiving signals. In general, the length is favorably a submultiple of a wavelength. For example, in the case where the frequency is 2.45 GHz, the length of the antenna may be about 60 mm (½ wavelength) or 30 mm (¼ wavelength).

Figure 11A:
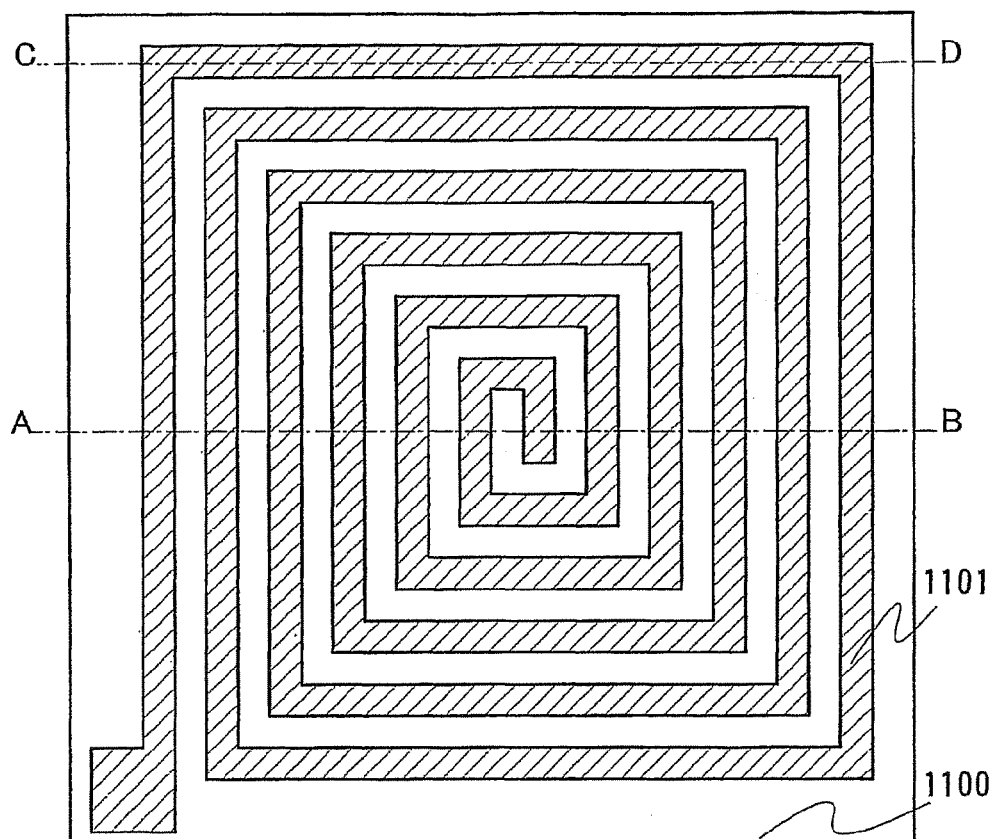
FIGS. 11A to 11C are diagrams showing an embodiment of an antenna of the invention.
Figure 11B:
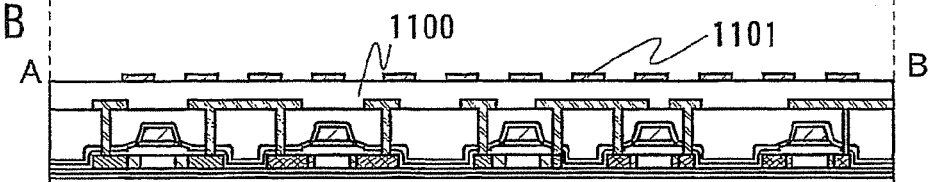
Figure 11C:
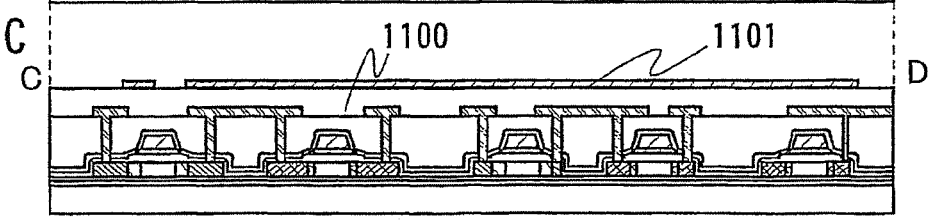
Figure 12:
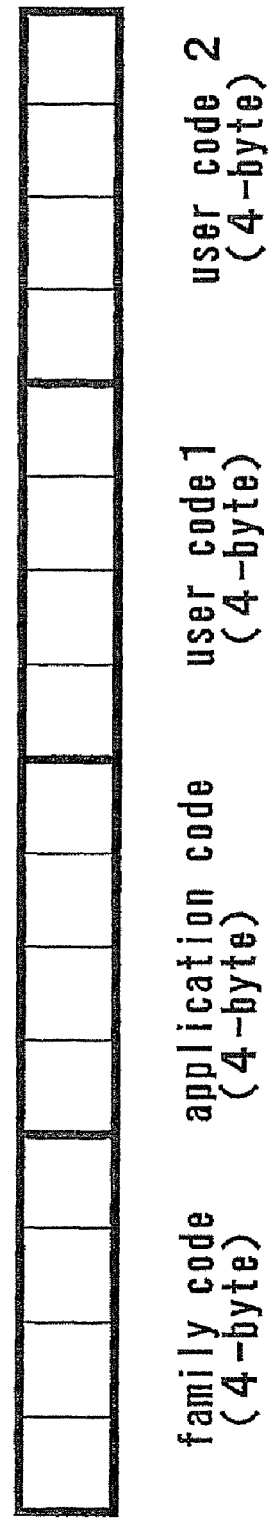
FIG. 12 is a diagram showing an example of data stored in a memory circuit.

Further, a substrate may be mounted over the circuit of the invention and an antenna may be formed thereover. FIGS. 11A to 11C show a top plan view and cross sectional views of an example thereof in which a substrate is mounted over the circuit and a spiral antenna is provided. An element substrate 1100 includes an antenna circuit, a voltage detecting circuit, a current amplifier circuit, a signal processing circuit, a fuse, and the like, and besides, a memory circuit, a processing circuit, or the like may be included. An antenna wiring 1101 is provided over the element substrate 1100. A magnetic-permeable insulating substrate can be employed for the element substrate 1100, which is preferable in that the directivity of the antenna is not lost even if the antenna wiring 1101 is formed over the same substrate.

The example shown in this embodiment is only an example and does not limit a shape of the antenna. The invention can be implemented with any shape of antenna. This embodiment can be implemented by using any combination of configurations described in the embodiment modes and Embodiments 1 to 7.

Embodiment 9

In this embodiment, a specific manufacturing method of a thin film integrated circuit device including a TFT is described with reference to FIGS. 22A to 24B. Here for simplicity, sectional structures of a CPU using an n-type TFT and a p-type TFT and a memory portion are shown to describe a manufacturing method.

Figure 22A:
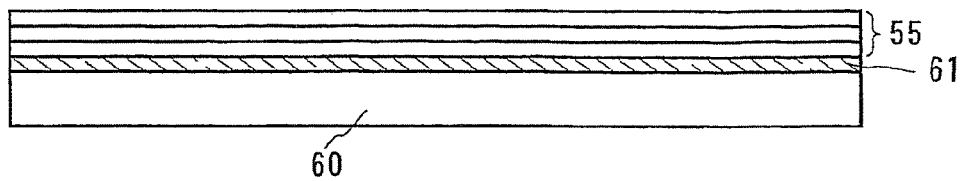
FIGS. 22A to 22E are cross-sectional views each at a step of the invention.

First, a peeling layer 61 is formed on a substrate 60 (FIG. 22A). Here, an a-Si film (amorphous silicon film) with a thickness of 50 nm is formed on a glass substrate (for example, Corning 1737 substrate) by low pressure CVD. It is to be noted that a quartz substrate, a substrate formed using an insulating substance such as alumina, a silicon wafer substrate, a plastic substrate having heat resistance against a processing temperature of a subsequent step, or the like as well as a glass substrate can be used for the substrate.

It is preferable that the peeling layer be formed using a film containing silicon as a main component, such as polycrystalline silicon, single crystalline silicon, and SAS (semi-amorphous silicon which is also referred to as microcrystalline silicon) as well as amorphous silicon, however, the invention is not limited to these. The peeling layer may be formed by plasma CVD, sputtering and the like as well as low pressure CVD. Further, a film doped with an impurity such as phosphorus may be used as well. The peeling layer preferably has a thickness of 50 to 60 nm. In the case of using SAS, the film thickness may be 30 to 50 nm.

Subsequently, a protective film 55 (also referred to as a base film or a base insulating film) is formed on the peeling layer 61 (FIG. 22A). Here, a three-layer structure of a silicon oxide film with a thickness of 100 nm, a silicon nitride film with a thickness of 50 nm, and a silicon oxide film with a thickness of 100 nm is employed, however, a material, thickness, and the number of stacked layers of the protective film 55 are not limited to these. For example, a heat resistant resin such as siloxane may be stacked with a thickness of 0.5 to 3 μm by spin coating, slit coating, a droplet discharge method and the like instead of the silicon oxide film of the bottom layer. Further, a silicon nitride film (SiN, $Si_3N_4$ and the like) may be used as well. Each thickness is preferably 0.05 to 3 μm and can be selected freely in this range.

Here, the silicon oxide film can be formed by thermal CVD, plasma CVD, normal pressure CVD, bias ECRCVD and the like by using a mixed gas of $SiH_4$ and $O_2$, or TEOS (tetraethyl orthosilicate) and $O_2$. Further, the silicon nitride film can be formed by plasma CVD using a mixed gas of $SiH_4$ and $NH_3$. Moreover, a silicon oxynitride film is typically formed by plasma CVD using a mixed gas of $SiH_4$ and $N_2O$.

In the case of using a material containing silicon such as a-Si as a main component for the peeling layer 61 and an island-shaped semiconductor film 57, a protective film to be in contact with them may be formed using $SiO_xN_y$ (x>y) in view of securing contact.

Subsequently, a thin film transistor (TFT) which constitutes a central processing unit (CPU) and a memory of a thin film integrated circuit device is formed over the protective film 55. It is to be noted that a thin film active element such as an organic TFT and a thin film diode can be formed as well as a TFT.

Figure 22B:
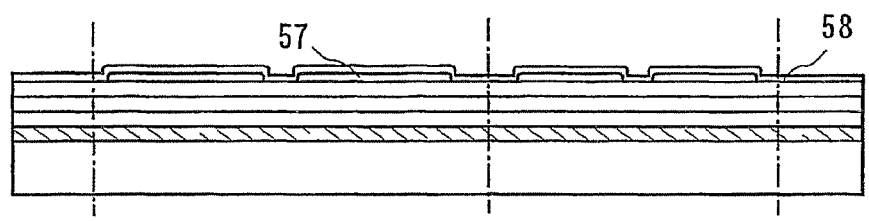

To manufacture the TFT, the island-shaped semiconductor film 57 is formed first over the protective film 55 (FIG. 22B). The island-shaped semiconductor film 57 is formed using an amorphous semiconductor, a crystalline semiconductor, or a semi-amorphous semiconductor. Any of these can be formed by using a semiconductor film containing silicon, silicon germanium (SiGe) and the like as a main component.

Here, an amorphous silicon film is formed with a thickness of 70 nm and a surface thereof is treated with a solution containing nickel. Further, a thermal crystallization step at 500 to 750° C. is performed to obtain a crystalline silicon semiconductor film, and then laser crystallization is carried out to improve the crystallinity thereof. Moreover, as the deposition method, plasma CVD, sputtering, LPCVD or the like can be used. As the crystallization method, laser crystallization, thermal crystallization, thermal crystallization using another catalyst (Fe, Ru, Rh, Pd, Os, Ir, Pt, Cu, Au and the like) may be performed. Alternatively, these crystallizations may be performed in turn a plurality of times.

For the crystallization treatment of the semiconductor film, a continuous wave laser may be used. Typically, in order to obtain large grain crystals in crystallization, a second harmonic (532 nm) or a third harmonic (355 nm) of an Nd:$YVO_4$ laser (the fundamental wave is 1064 nm) is preferably used. In the case of using a harmonic of a continuous wave laser, laser light emitted from a continuous wave $YVO_4$ laser with an output of 10 W may be obtained by a non-linear optical element. Moreover, a harmonic may be emitted by setting a $YVO_4$ crystal or a $GdVO_4$ crystal and a non-linear optical element in a resonator. The semiconductor film is irradiated with laser light formed into rectangular or elliptical laser light on an irradiated surface by an optical system. The power density at this time is required to be about 0.01 to 100 $MW/cm^2$ (preferably 0.1 to 10 $MW/cm^2$). Then, the laser light is irradiated by moving the semiconductor film relatively to the laser light at a rate of about 10 to 2000 cm/s.

In the case of using a pulsed laser, a frequency band of about several ten to several hundred Hz is typically used, however, a pulsed laser having an oscillation frequency of 10 MHz or more, which is drastically higher than the aforementioned may be use as well. It takes several ten to several hundred nsec until the semiconductor film irradiated with pulsed laser light is completely solidified. Therefore, by using the aforementioned high frequency band, a semiconductor film can be irradiated with the next pulsed laser light until the semiconductor film dissolved by the previous laser light is solidified. Accordingly, a solid-liquid interface of the semiconductor film can be continuously moved, which is different than the case of using a conventional pulsed laser. Thus, a semiconductor film having crystal grains which are continuously grown in a scanning direction can be formed. For example, an aggregation of crystal grains of which width in a scanning direction is 10 to 30 μm and the width in a direction perpendicular to the scanning direction is about 1 to 5 μm can be formed. By forming single crystal grains which extend long in the scanning direction, a semiconductor film can be formed in which any crystal grain boundaries hardly exist in at least a channel direction of the TFT.

It is to be noted that in the case where siloxane which is a heat resistant organic resin is partially used for the protective film 55, heat leaks from the semiconductor film in the aforementioned crystallization can be prevented and efficient crystallization can be performed.

By the aforementioned method, a crystalline silicon semiconductor film is obtained. Note that the crystals are preferably aligned in source, channel, and drain directions. Further, it is preferable that the thickness of the crystalline layer be 20 to 200 nm (typically 40 to 170 nm, or more preferably 50 to 150 nm). After that, an amorphous silicon film for gettering metal catalysts is formed over the semiconductor film with an oxide film interposed therebetween, and then gettering treatment is performed by thermal treatment at 500 to 750° C. Further, in order to control a threshold value of a TFT element, boron ions are injected at a dosage of $10^{13}/cm^2$ to the crystalline silicon semiconductor film. After that, etching is performed with a resist as a mask, so that the island-shaped semiconductor film 57 is formed.

The crystalline semiconductor film can also be formed by directly forming a polycrystalline semiconductor film by LPCVD (Low Pressure CVD) with disilane ($Si_2H_6$) and germanium fluoride ($GeF_4$) as a source gas. The gas flow rate is $Si_2H_6/GeF_4=20/0.9$, the deposition temperature is 400 to 500° C., and He or Ar is used as a carrier gas here although the invention is not limited to this.

Note that the channel region in particular in a TFT is preferably added with hydrogen or halogen of $1\times10^{19}$ to $1\times10^{22}/cm^3$, or more preferably $1\times10^{19}$ to $5\times10^{20}/cm^3$. In the case of SAS, $1\times10^{19}$ to $2\times10^{21}/cm^3$ is preferable. In any cases, it is preferable that more hydrogen or halogen be contained than that contained in a single crystal used for an IC chip. Accordingly, even when a crack is generated locally in a TFT portion, hydrogen or halogen can terminate it.

Next, a gate insulating film 58 is formed on the island-shaped semiconductor film 57 (FIG. 22B). It is preferable that the gate insulating film 58 be formed by using a thin film forming method such as plasma CVD or sputtering to form a film containing silicon nitride, silicon oxide, silicon nitride oxide or silicon oxynitride in a single layer or by stacking. In the case of stacking the layers, for example, a three-layer structure is preferably employed in which a silicon oxide film, a silicon nitride film, and a silicon oxide film are stacked in this order from the substrate side.

Figure 22C:
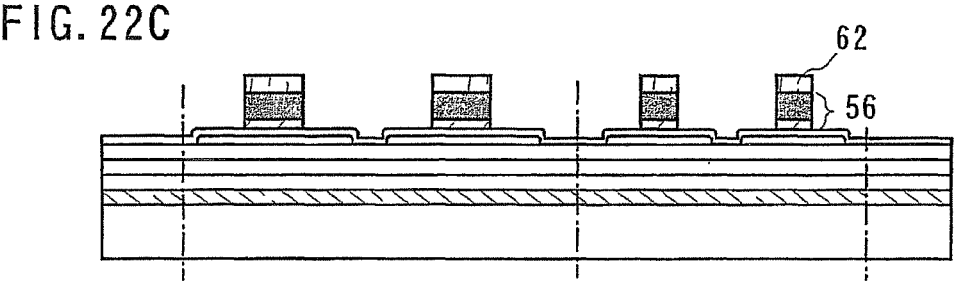
Figure 22D:
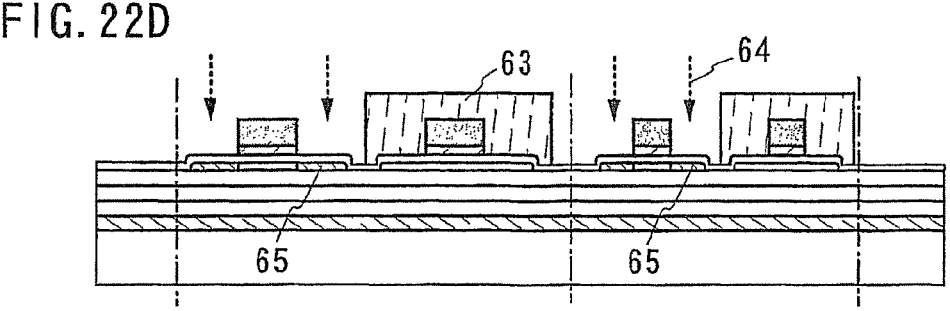

Next, a gate electrode 56 is formed (FIG. 22C). Here, the gate electrode 56 is formed by stacking Si and W (tungsten) by sputtering and etching it with a resist 62 as a mask. It is needless to say that a material, a structure, and a manufacturing method of the gate electrode 56 are not limited to these and can be appropriately selected. For example, a stacked-layer structure of Si doped with an N-type impurity and NiSi (nickel silicide) or a stacked-layer structure of tantalum nitride and tungsten may be employed as well. Further, a single layer using various conductive materials may be employed.

Further, a mask of silicon oxide or silicon oxynitride (which is called a hard mask) may be used instead of the resist mask. In this case, a patterning step for forming the hard mask is additionally required, however, a gate electrode layer having a desired width can be formed as the mask is not decreased as much as the resist in etching. Moreover, the gate electrode 56 may be selectively formed by a droplet discharge method without using the resist 62.

As a conductive material, various materials can be selected according to a function of a conductive film. Further, in the case of forming a gate electrode and an antenna at the same time, the material is to be selected in consideration of functions thereof.

It is to be noted that a mixed gas of $CF_4$, $Cl_2$, and $O_2$ or a $Cl_2$ gas is used as the etching gas for etching the gate electrode, however, the invention is not limited to these.

Subsequently, portions to be p-type TFTs 70 and 72 are covered with a resist 63 and the island-shaped semiconductor films in n-type TFTs 69 and 71 are doped with an impurity element 64 which imparts n-type conductivity (typically, P (phosphorus) or As (arsenic)) at a low concentration (a first doping step, FIG. 22D) with the gate electrode as a mask. The first doping step is carried out with a condition of a dosage of $1\times10^{13}$ to $6\times10^{13}/cm^2$ and an acceleration voltage of 50 to 70 keV, however, the invention is not limited to this. By the first doping step, through doping is carried out through the gate insulating film 58, thereby a pair of n-type low concentration impurity regions 65 is formed. It is to be noted that the first doping step may be performed to an entire surface without covering the p-type TFT regions with a resist.

Figure 22E:
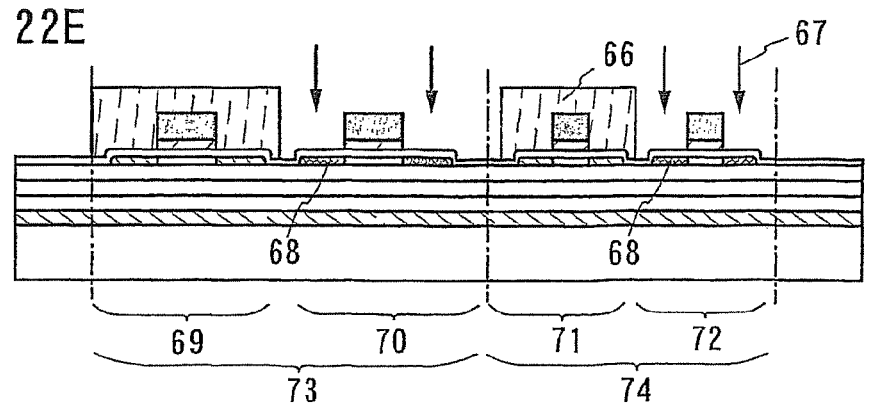

Then, after removing the resist 63 by ashing and the like, a resist 66 to cover the n-type TFT region is additionally formed, and an impurity element 67 which imparts p-type conductivity (typically, B (boron)) is doped into the island-shaped semiconductor films of the p-type TFTs 70 and 72 at a high concentration with the gate electrode as a mask (a second doping step, FIG. 22E). The second doping step is carried out with a condition of a dosage of $1\times10^{16}$ to $3\times10^{16}/cm^2$ and an acceleration voltage of 20 to 40 keV, however, the invention is not limited to this. By this second doping step, through doping is carried out through the gate insulating film 58, thereby a pair of p-type high concentration impurity regions 68 is formed.

Figure 23F:
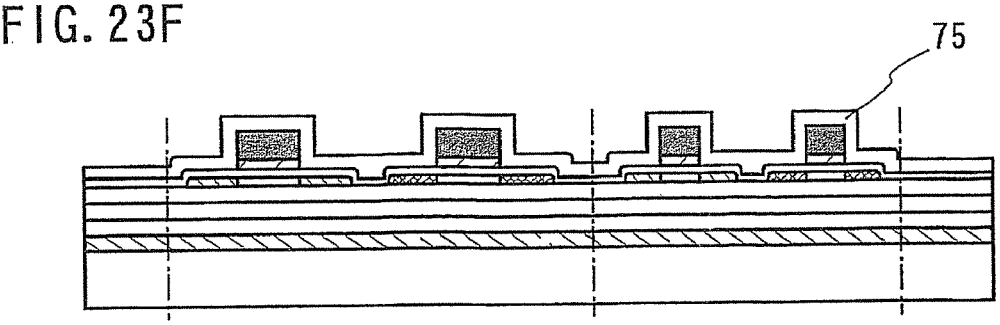
FIGS. 23F to 23I are cross-sectional views each at a step of the invention.
Figure 23G:
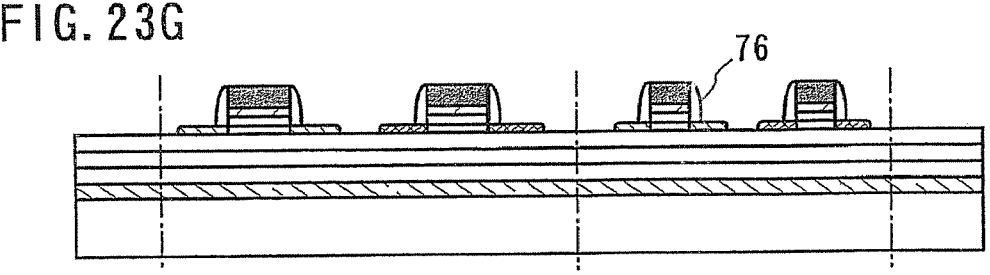

Subsequently, after removing the resist 66 by ashing and the like, an insulating film 75 is formed over the substrate (FIG. 23F). Here, a $SiO_2$ film is formed with a thickness of 100 nm by plasma CVD. After that, the insulating film 75, and the gate insulating film 58 are etched back to be removed, thereby a side wall 76 is formed in a self-aligned manner (FIG. 23G). As the etching gas, a mixed gas of $CHF_3$ and He is used. It is to be noted that a step for forming the side wall is not limited to this.

Note that if an insulating film is also formed over a back surface of the substrate when forming the insulating film 75, the insulating film on the back surface is removed by etching with the resist covering entire surface of the substrate as a mask (back treatment).

Figure 24A:
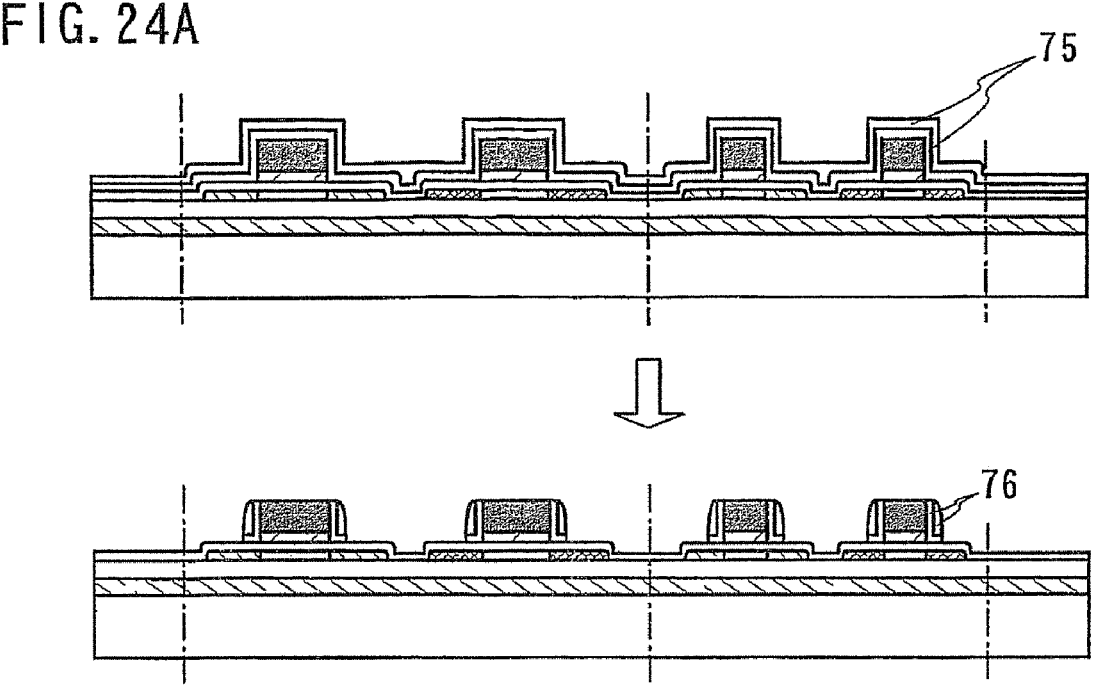
FIGS. 24A and 24B are cross-sectional views at a step of the invention.

It is to be noted that a method for forming the side wall 76 is not limited to the aforementioned. For example, methods shown in FIGS. 24A and 24B can be employed as well. FIG. 24A shows an example in the case where the insulating film 75 has a two or more layer structure. As the insulating film 75, for example, a SiON (silicon oxynitride) film with a thickness of 100 nm and an LTO (Low Temperature Oxide) film with a thickness of 200 nm are stacked. Here, the SiON film is formed by plasma CVD and the LTO film is formed by forming a $SiO_2$ film by low pressure CVD. After that, the side wall 76 having an L shape and a circular shape is formed by etching back.

Figure 24B:
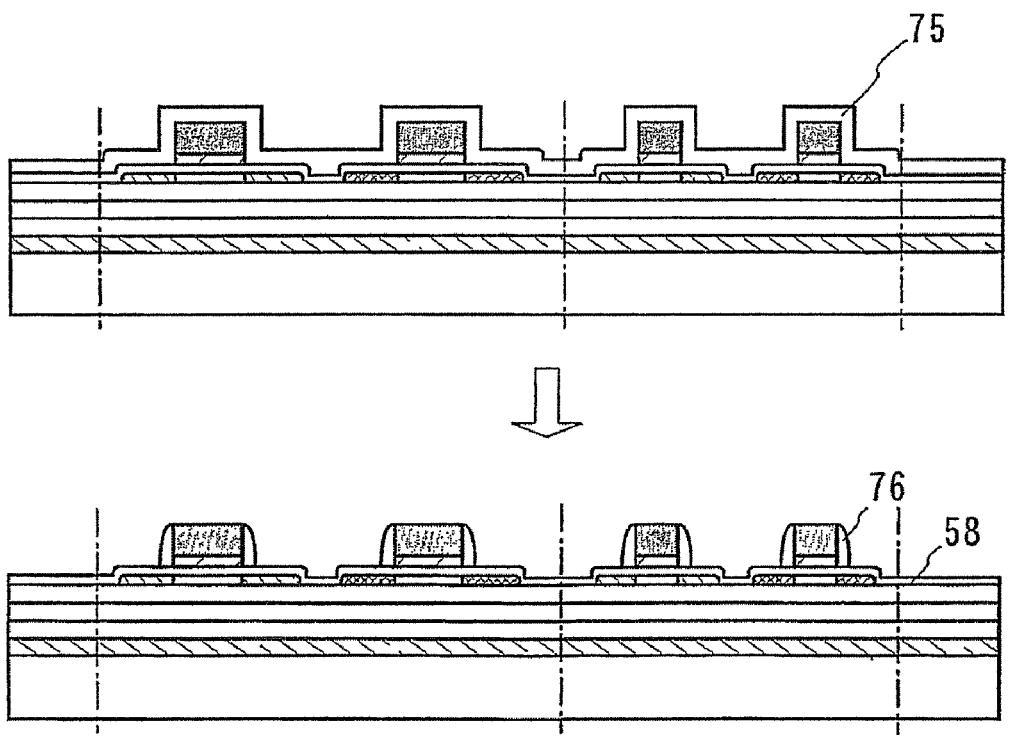

FIG. 24B shows an example in the case where etch back is performed so as to leave the gate insulating film 58. The insulating film 75 in this case may have a single layer structure or a stacked-layer structure.

The sidewall functions as a mask used for doping an N-type impurity at a high concentration and forming a low concentration impurity region or a non-doped offset region under the sidewall 76. In any of the aforementioned methods for forming the sidewall, a condition of the etch back may be appropriately changed according to a width of the low concentration impurity region or the offset region to be formed.

Figure 23H:
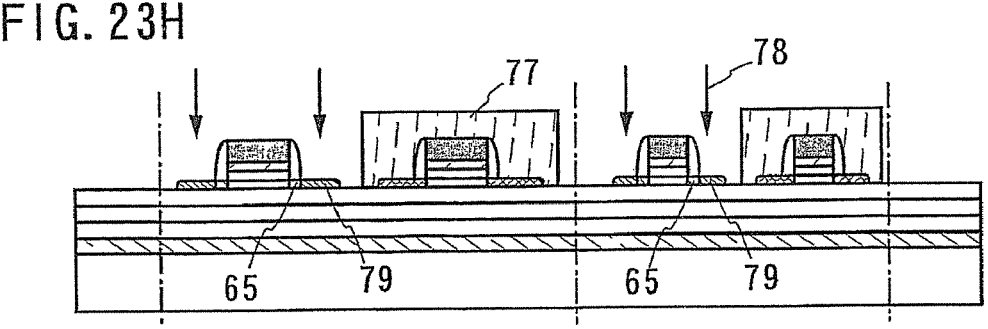

Subsequently, a resist 77 to cover the p-type regions is additionally formed and an impurity element 78 which imparts n-type conductivity (typically, P or As) is doped at a high concentration with the gate electrode 56 and the sidewall 76 as masks (a third doping step, FIG. 23H). The third doping step is carried out with a condition of a dosage of $1\times10^{13}$ to $5\times10^{15}/cm^2$ and an acceleration voltage of 60 to 100 keV. By this third doping step, thereby a pair of n-type high concentration impurity regions 79 is formed.

It is to be noted that the impurity regions may be thermally activated after removing the resist 77 by ashing and the like. For example, after forming a silicon oxynitride film with a thickness of 50 nm, thermal treatment may be performed in nitrogen atmosphere at 550° C. for 4 hours. Further, by applying thermal treatment in nitrogen atmosphere at 410° C. for 1 hour after forming a silicon nitride film containing hydrogen with a thickness of 100 nm, a crystal defect of the crystalline semiconductor film can be improved. This treatment is referred to as a hydrogenation process, by which dangling bonds in crystalline silicon are terminated. Further, as a cap insulating film for protecting TFTs, a silicon oxynitride film is subsequently formed with a thickness of 600 nm. It is to be noted that the hydrogenation process may be performed after forming the silicon oxynitride film. In this case, a silicon nitride film and a silicon oxynitride film can be continuously formed. In this manner, an insulating film having a three-layer structure in which a silicon oxynitride film, a silicon nitride film, and a silicon oxynitride film are formed in this order is formed over the TFT, however, structure and a material thereof are not limited to these. These insulating films are preferably formed since they also have a function to protect TFTs.

Figure 23I:
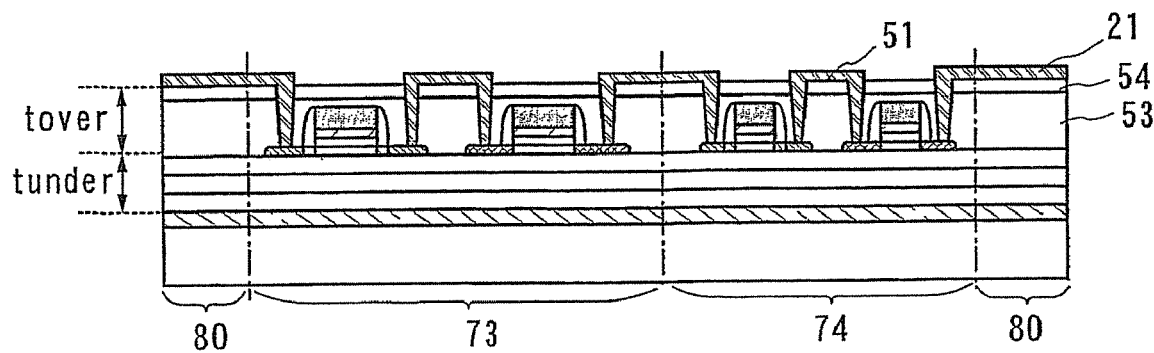

Subsequently, an interlayer film 53 is formed over the TFTs (FIG. 23I). The interlayer film 53 can be formed using a heat resistant organic resin such as polyimide, acrylic, polyimide, and siloxane by spin coating, dipping, spray coating, a droplet discharge method (ink-jetting, screen printing, offset printing and the like), a doctor knife, a roll coater, a curtain coater, a knife coater and the like. Further, an inorganic material may be used as well, for which silicon oxide, silicon nitride, silicon oxynitride, PSG (phosphorus glass), BPSG (phosphorus boron glass), an alumina film or the like can be used. It is to be noted that these insulating films may be stacked to form the interlayer film 53.

Further, a protective film 54 may be formed on the interlayer film 53. The protective film 54 can be formed using a film containing carbon such as DLC (Diamond-Like Carbon) or carbon nitride (CN), or a silicon oxide film, a silicon nitride film or a silicon nitride oxide film by plasma CVD, atmospheric plasma or the like. Alternatively, a photosensitive or non-photosensitive organic material such as polyimide, acrylic, polyamide, resist or benzocyclobutene, or a heat resistant organic resin such as siloxane may be used.

It is to be noted that a filler may be mixed in the interlayer film 53 or the protective film 54 in order to prevent these films from being peeled off or cracked due to a stress generated by a difference in a thermal expansion rate between the interlayer film 53 or the protective film 54 and a conductive material or the like which forms a wiring later.

Subsequently, after forming a resist, contact holes are opened by etching, and then a wiring 51 to connect TFTs to each other and a connecting wiring 21 for connecting to an external antenna are formed (FIG. 23I). The contact hole is opened by etching using a mixed gas of $CHF_3$ and He, however, the invention is not limited to this. Further, the wiring 51 and the connecting wiring 21 may be formed using the same material at the same time or separately. Here, the wiring 51 connected to the TFT has a five-layer structure of Ti, titanium nitride (TiN), Al (added with Si), Ti, and titanium nitride (TiN), which is formed by sputtering and patterning.

By mixing Si in the Al layer, hillock can be prevented from being generated in resist baking at the time of wiring patterning. Moreover, about 0.5% of Cu may be mixed instead of the Si. Further, by sandwiching the Al (added with Si) layer with Ti and titanium nitride, hillock resistance can be further improved. Note that it is preferable to use the aforementioned hard mask formed using silicon oxynitride or the like in patterning. Note that material and a forming method of the wiring are not limited to these, and the material used for the gate electrode may be employed as well.

In this embodiment, TFT regions constituting a CPU 73, a memory 74 and the like and a terminal portion 80 connected to an antenna are formed over the same substrate, however, this embodiment can be applied to the case of forming the TFT region and the antenna over the same substrate. In this case, it is preferable to form the antenna on the interlayer film 53 or the protective film 54, and then cover the antenna with another protective film. As the conductive material for the antenna, Ag, Au, Al, Cu, Zn, Sn, Ni, Cr, Fe, Co, or Ti, or an alloy containing these can be used, however, the invention is not limited to these. The wiring and antenna may be formed using different materials. It is to be noted that the wiring and antenna are preferably formed to have a highly ductile metal material and more preferably formed thick enough to resist a stress of deformation.

The wiring and antenna may be formed by patterning using a resist mask after depositing a conductive material on the entire surface by sputtering or by selectively discharging a conductive material from a nozzle by a droplet discharge method. It is to be noted that the droplet discharge method here is not limited to an ink-jetting but includes offset printing, screen printing and the like. The wiring and antenna may be formed at the same time or one of them may be formed first so that the other overlaps it.

Through the aforementioned steps, a thin film integrated circuit device formed using TFTs is completed. In this embodiment, a top gate structure is employed, however, a bottom gate structure (inversely staggered structure) may be employed as well. It is to be noted that a base insulating film material, an interlayer insulating film material, and a wiring material are mainly provided in a region where a thin film active element portion (active element) such as a TFT does not exist. It is preferable that this region occupy 50% or more of the thin film integrated circuit device, and more preferably 70 to 95% thereof. Accordingly, an ID chip can be easily bent and a completed product such as an ID label can be easily handled. In this case, an island-shaped semiconductor region (island) of the active element including the TFT portion preferably occupies 1 to 30% of the thin film integrated circuit device, and more preferably 5 to 15% thereof.

Further, as shown in FIG. 23I, it is preferable to control the thickness of the upper or lower protective film or the interlayer film so that the distance ($t_{under}$) from the semiconductor layer of the TFT to the lower protective film and the distance ($t_{over}$) from the semiconductor layer to the upper interlayer film (the protective layer in the case where the protective layer is formed) are equal or substantially equal to each other in the thin film integrated circuit device. By locating the semiconductor layer in the center of the thin film integrated circuit device in this way, stress to the semiconductor layer can be eased, and cracks can be prevented.

Embodiment 10

In this embodiment, a semiconductor device of the invention can be applied to an IC card, an IC tag, an RFID, a transponder, a paper money, valuable securities, a passport, an electronic device, a bag, and clothes. Examples of an IC card, an ID tag, an ID chip, and the like are described with reference to FIGS. 18A to 18H.

Figure 18A:
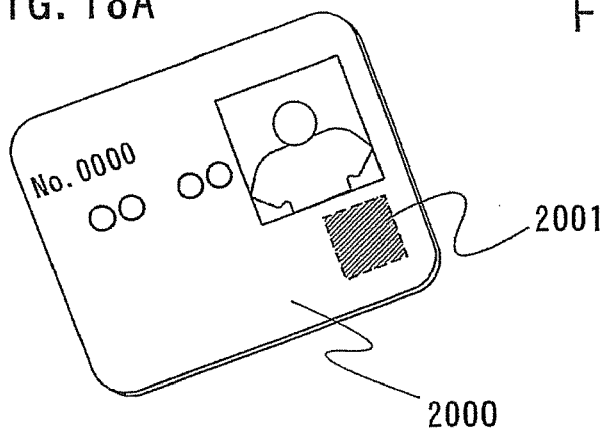
FIGS. 18A to 18H are views illustrating applications of the invention.

FIG. 18A illustrates an IC card 2000 which can be used for identification of an individual and as a credit card or electronic money with which payment can be made without using cash by utilizing a rewritable memory in an incorporated circuit. A circuit portion 2001 using the invention is incorporated in the IC card 2000.

Figure 18B:
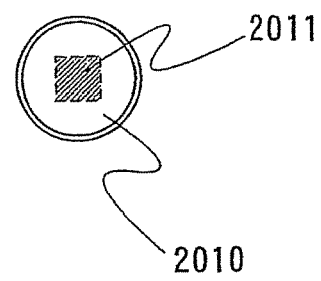

FIG. 18B illustrates an ID tag 2010 which can be used for identification of an individual and for management of entrance at a specific place by virtue of its compactness. A circuit portion 2011 using the invention is incorporated in the ID tag 2010.

Figure 18C:
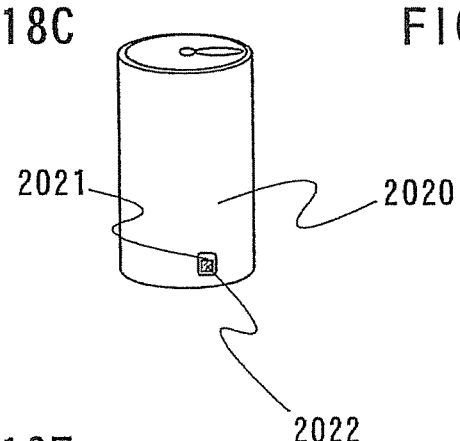

FIG. 18C illustrates the case where an ID chip 2022 is attached to merchandise 2020 for merchandise management at a retail store such as a supermarket. The invention is applied to a circuit in the ID chip 2022. By attaching the ID chip 2022 to the merchandise 2020, not only the inventory management is simplified, but also shoplifting and the like can be prevented. In FIG. 18C, a protective film 2021 is provided for adhesion to prevent the ID chip 2022 from being detached, however, the ID chip 2022 may be directly attached to the merchandise 2020 with an adhesive. Moreover, it is preferable that a flexible substrate as mentioned in Embodiment 2 be used for forming the ID chip 2022 in view of attaching to merchandise.

Figure 18D:
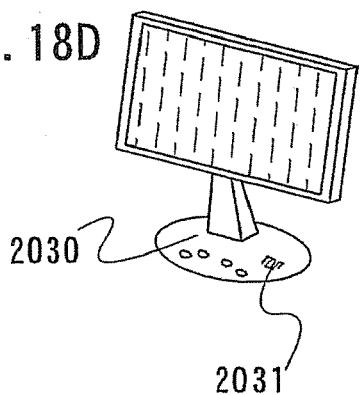

FIG. 18D illustrates the case where an ID chip for recognition 2031 is incorporated in merchandise during manufacture. In FIG. 18D, the ID chip 2031 is incorporated in a housing 2030 of a display. The invention is applied to a circuit in the ID chip 2031. With such a structure, recognition of a manufacturer, merchandise distribution management, and the like can be simplified. Note that a housing of a display is taken as an example here, however, the invention is not limited to this and can be applied to various electronic devices and objects.

Figure 18E:
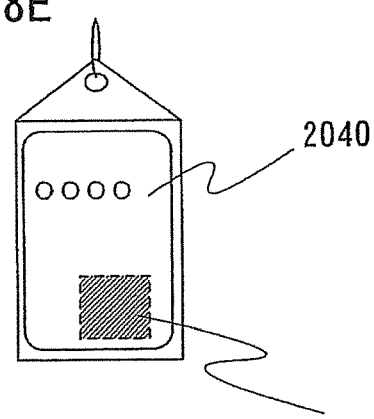

FIG. 18E illustrates a shipping tag 2040 for transporting objects. In FIG. 18E, an ID chip 2041 is incorporated in the shipping tag 2040. The invention is applied to a circuit in the ID chip 2041. With such a structure, selection of destination, merchandise distribution management, and the like can be simplified. Note that the shipping tag is fastened to a string for tying up an object here, however, the invention is not limited to this and the tag may be directly attached to an object with a sealing material or the like.

Figure 18F:
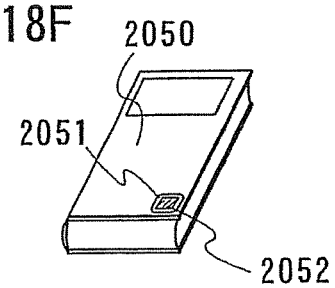

FIG. 18F illustrates a book 2050 incorporating an ID chip 2052. The invention is applied to a circuit in the ID chip 2052. With such a structure, distribution management at a bookstore, circulation management at a library, and the like can be simplified. In FIG. 18F, a protective film 2051 is used for adhesion to prevent the ID chip 2052 from being detached, however, the ID chip 2052 may be directly attached with an adhesive or incorporated in a book cover of the book 2050.

Figure 18G:
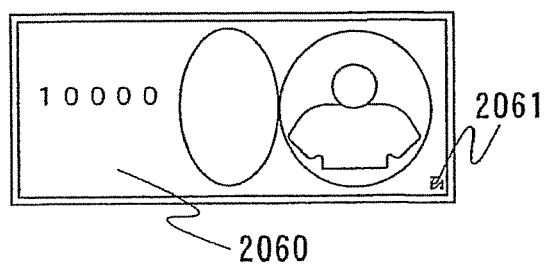

FIG. 18G illustrates paper money 2060 incorporating an ID chip 2061. The invention is applied to a circuit in the ID chip 2061. With such a structure, circulation of counterfeit paper money can be prevented easily. Note that the ID chip 2061 is preferably embedded in the paper money 2060 in order to prevent the ID chip 2061 from being detached due to the nature of paper money. The invention can be applied to an object made of paper such as valuable securities and a passport as well as paper money.

Figure 18H:
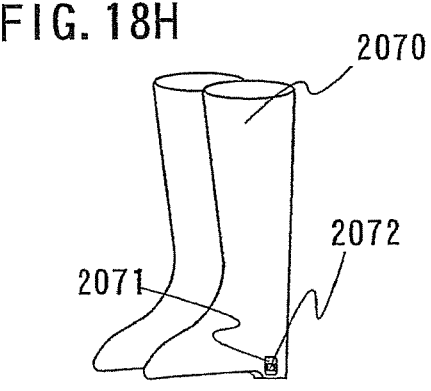

FIG. 18H illustrates shoes 2070 incorporating an ID chip 2072. The invention is applied to a circuit in the ID chip 2072. With such a structure, recognition of a manufacturer, merchandise distribution management, and the like can be simplified. In FIG. 18H, a protective film 2071 is provided for adhesion to prevent the ID chip 2072 from being detached, however, the ID chip 2072 may be directly attached with an adhesive or embedded in the shoes 2070. The invention can be applied to a wearable object such as clothes and a bag as well as shoes.

The case where an ID chip is set to various objects in order to protect the security thereof is described now. The security protection can be considered from the viewpoint of exclusion of theft or exclusion of counterfeit.

Figure 25:
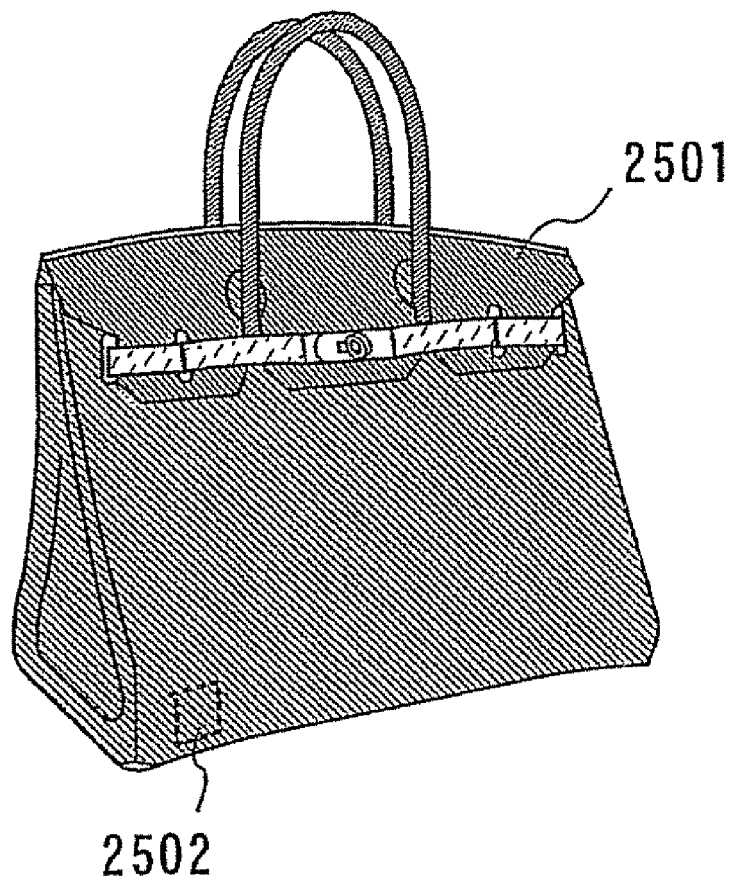
FIG. 25 is a view illustrating a bag using the invention.

The case where an ID chip is set to a bag is described as an example of exclusion of theft. As shown in FIG. 25, an ID chip 2502 is set to a bag 2501. For example, the ID chip 2502 can be set to a part of the bottom or side of the bag 2501. The ID chip 2502 that is very thin and compact can be set without spoiling the design of the bag 2501. Moreover, the ID chip 2502 has translucency, thus it is difficult for a stealer to judge whether the ID chip 2502 is set or not. Therefore, the ID chip 2502 is scarcely detached by the stealer.

When such a bag provided with an ID chip is stolen, information on a present position of the bag can be obtained using a GPS (Global Positioning System), for example. Note that the GPS is a system to position based on a time difference obtained by receiving a signal from a GPS satellite.

As for an object left behind or dropped in addition to such a stolen object, information on the present position can be obtained using a GPS.

An ID chip can also be set to a vehicle such as an automobile and a bicycle, a watch, or an accessory as well as a bag.

As an example of the exclusion of counterfeit, the case where an ID chip is set to a passport, a certificate, or the like is described next.

Figure 26A:
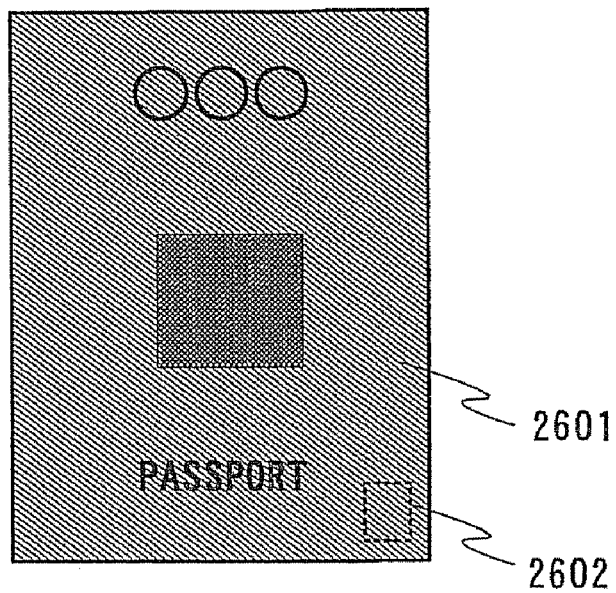
FIGS. 26A and 26B are views each illustrating a certificate using the invention.

FIG. 26A illustrates a passport 2601 provided with an ID chip. In FIG. 26A, an ID chip 2602 is set to a cover of the passport 2601, however, it may be set to another page and may be set to a surface of the cover since the ID chip 2602 has translucency. Alternatively, the ID chip 2602 may be embedded in the cover so as to be sandwiched by a material for the cover and the like.

Figure 26B:
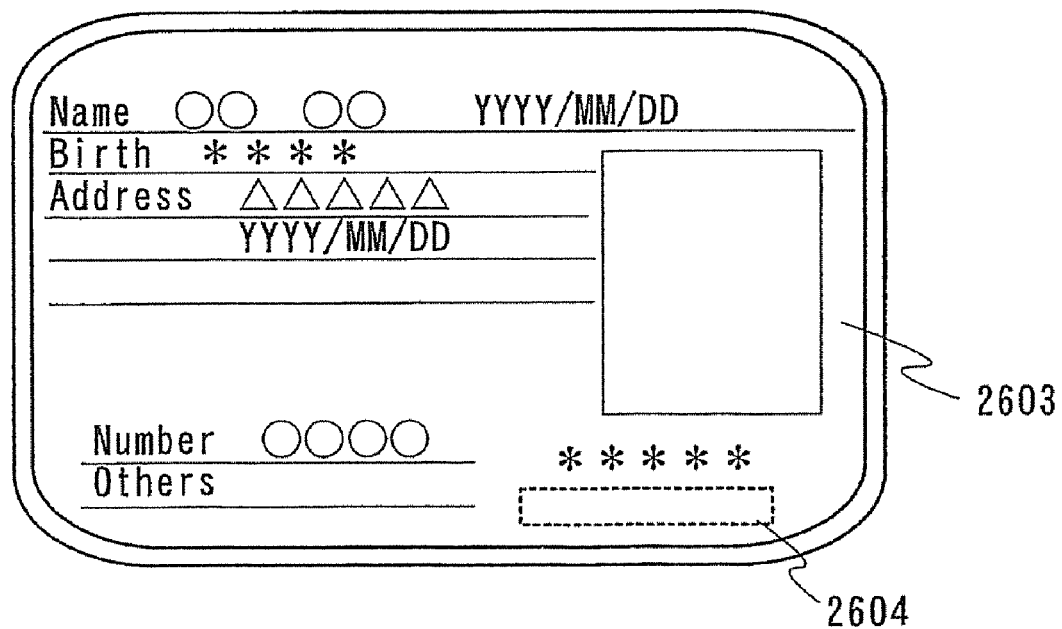

FIG. 26B illustrates a certificate 2603 provided with an ID chip. In FIG. 26B, an ID chip 2604 is embedded in the certificate 2603. The ID chip 2604 which has translucency may be set on a print side of the certificate 2603; for example, the ID chip 2604 is set on the print side of the certificate 2603, which is sandwiched with respective pairs of heat curable resin films and resin films, and thermocompression bonding is performed, so that the certificate 2603 to which the ID chip 2604 is set can be covered. Alternatively, the ID chip 2604 may be embedded in the certificate 2603 by sandwiching it by a material for the certificate 2603.

By setting an ID chip to these objects, counterfeit thereof can be prevented. In addition, counterfeit of a bag is also prevented by setting an ID chip thereto. The ID chip that is very thin and compact can be set, thereby the design of a passport, a certificate, or the like is not spoiled. Moreover, the ID chip has translucency, thus it may be set on the surface thereof.

In addition, according to the ID chip, supervision of the passport, the certificate, or the like can be simplified. Moreover, data can be stored in the ID chip without writing data directly therein, thereby the privacy can be protected.

Figure 27:
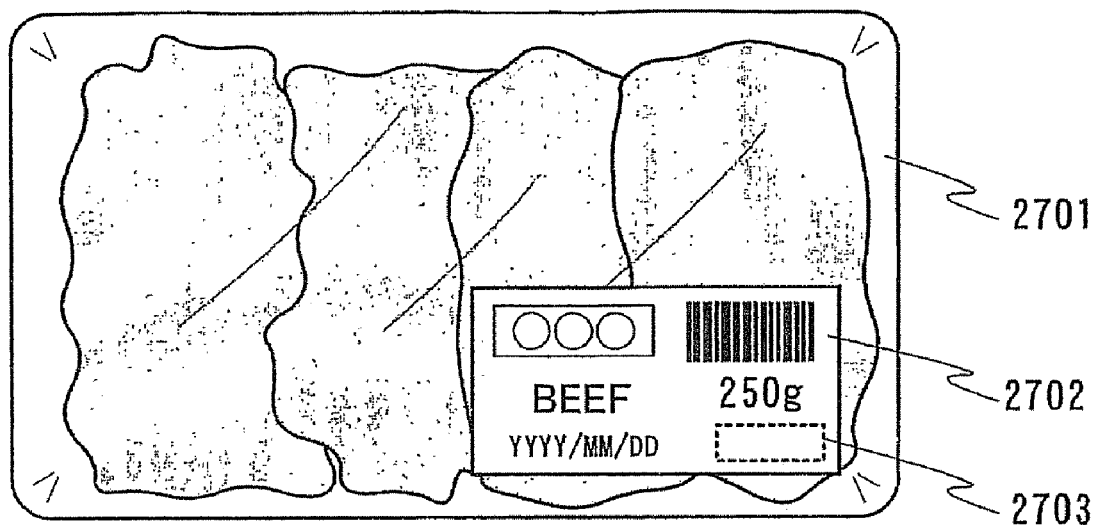
FIG. 27 is a view illustrating grocery control using the invention.

The case where an ID chip is set to merchandise such as a grocery for safety control is described with reference to FIG. 27. A label 2702 provided with an ID chip 2703 and a package for meat 2701 on which the label 2702 is attached are shown. The ID chip 2703 may be set on a surface of the label 2702 or embedded in the label 2702. In the case of fresh food such as vegetables, the ID chip may be set to a wrap for the fresh food.

The ID chip 2703 can store basic data of the merchandise such as a place of production, a producer, a pack date, and an expiration date, and application data such as a cooking example using the merchandise. The basic data that is not required to be rewritten is preferably stored in a memory which is not capable of being rewritten such as an MROM. The application data is preferably stored in a memory which is capable of being rewritten and erased such as an EEROM.

In addition, for safety control of groceries, it is important that states of pre-processed plants and animals can be obtained. In view of this, an ID chip may be preferably embedded in the plants and animals so that data thereon is obtained with a reader device. The data on plants and animals includes a breeding place, feed, a breeder, and the presence of any contagious disease.

Furthermore, in the case where an ID chip stores a price of the merchandise, settlement can be carried out more simply in a shorter time compared to the case where a barcode is used as is conventional. That is, plural pieces of merchandise provided with ID chips can be checked out all at once. Note that in the case where a plurality of ID chips are read out in this manner, the reader device is required to be provided with an anti-collision function.

Moreover, the settlement of merchandise is possible even when the distance between a register and the merchandise is far, which depends on a communication distance of the ID chip. The ID chip can also serve to prevent shoplifting.

In addition, an ID chip can be used in combination with another information medium such as a barcode and a magnetic tape. For example, the basic data that is not required to be rewritten is stored in the ID chip while data to be renewed such as data on a discounted price or a special price is stored in the barcode, because data in the barcode can be easily revised unlike the ID chip.

By setting an ID chip as described above, the volume of data for a consumer can be increased, so that the consumer can purchase the merchandise without anxiety.

Figure 28A:
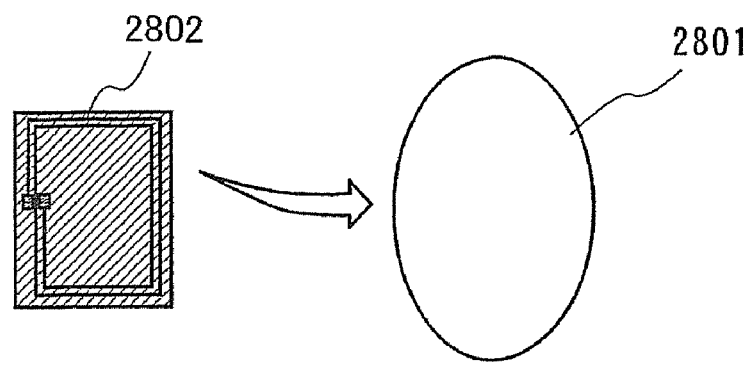
FIGS. 28A and 28B are views illustrating physical distribution management using the invention.
Figure 28B:
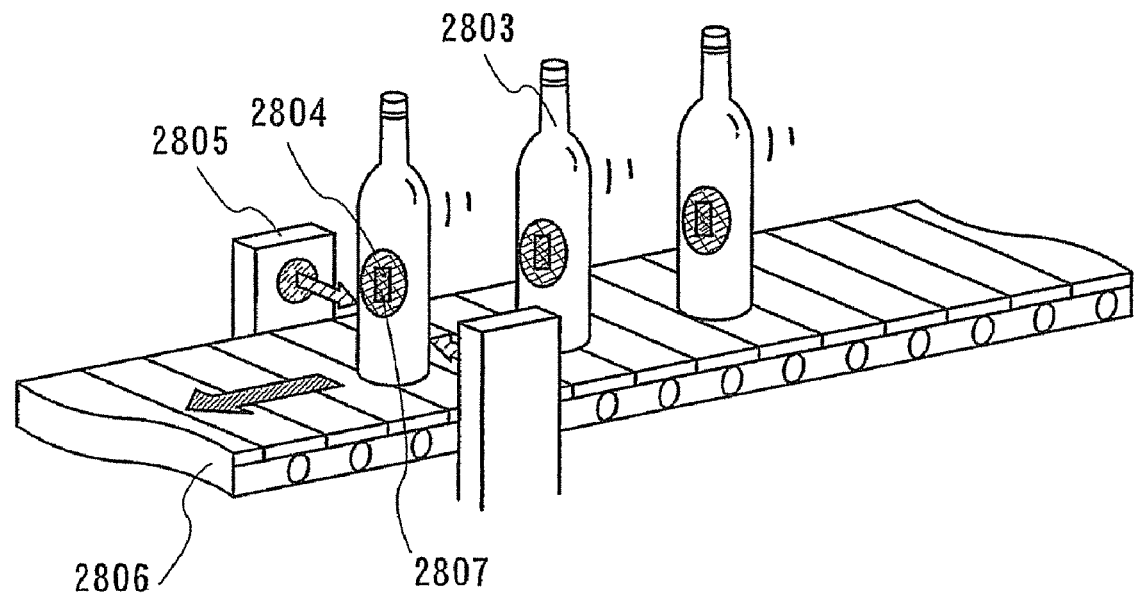

The case where an ID chip is set to merchandise such as a beer bottle for physical distribution management is described below. As shown in FIG. 28A, an ID chip 2802 is set to a beer bottle. For example, the ID chip 2802 may be attached using a label 2801.

The ID chip stores basic data such as a date manufactured, a manufacturing place, and a material thereof. Such basic data is not required to be rewritten, thus it is preferably stored in a memory which is not capable of being rewritten such as an MROM. In addition, the ID chip stores individual data such as an address, a date and time for delivery of the beer bottle. For example, the address and the date and time for delivery can be stored in an ID chip 2807 in a label 2804 when a beer bottle 2803 passes through a writer device 2805 with a flow of a belt conveyor 2806. Such individual data can be preferably stored in a memory which is capable of being rewritten and erasing such as an EEROM.

In addition, a system may be preferably built such that when data on the merchandise purchased is sent from a shop to a physical distribution management center through network, a writer device, or a personal computer or the like for controlling the writer device calculates an address, and a date and time based on the data on the merchandise, to store in the ID chip.

Note that a beer bottle is delivered per case. In view of this, it is possible that an ID chip is set per case or per a plurality of cases to store individual data.

As for a something to drink to which a plurality of addresses for delivery may be stored, time required for inputting manually can be suppressed, thereby input errors due to the manual procedures can be reduced by setting an ID chip. In addition to this, manpower cost that is the most expensive in the field of the physical distribution management can be reduced. Accordingly, the setting of an ID chip enables physical distribution management with less errors at low cost.

In addition, application data such as groceries matched well with beer and a recipe using beer can be recorded by a receiver. Consequently, advertisement of the groceries and the like are carried out at the same time, which drives the consumers to buy. Such application data can be preferably stored in a memory which is capable of being rewritten and erased such as an EEROM. By setting an ID chip as described above, the volume of data for a consumer can be increased, so that the consumer can purchase the merchandise without anxiety.

An article of manufacture provided with an ID chip and a manufacturing apparatus (a manufacturing robot) controlled based on data of the ID chip for manufacturing control are described below.

Nowadays, original merchandise is produced in many cases, which are manufactured in accordance with original data of the merchandise on a manufacture line. For example, in a manufacture line of an automobile in which a painting color of a door can be selected appropriately, an IDF chip is set at an automobile and an painting apparatus is controlled based on data, from the ID chip. Accordingly, an original automobile can be manufactured. As a result of setting an ID chip, the sequence of automobiles to be pumped into the manufacture line and the number of automobiles to have the same color are not required to be controlled in advance. Consequently, any program for controlling the sequence and the number of automobiles, and the painting apparatus so as to correspond to them is not required to be set. That is, the manufacturing apparatus can operate individually based on data of the ID chip that is set to each the automobile.

As described hereinbefore, an ID chip can be used in various places. Individual data on manufacture can be obtained from data stored in the ID chip so that a manufacturing apparatus can be controlled based on the data.

Figure 29:
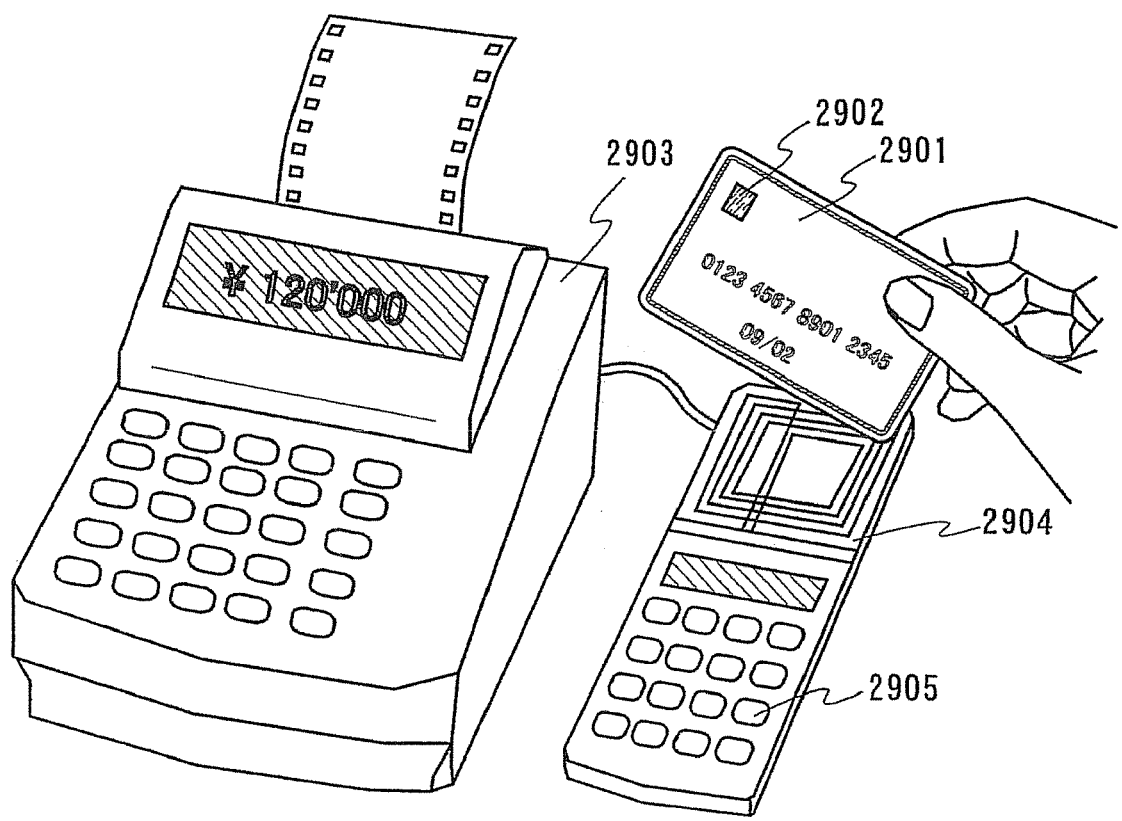
FIG. 29 is a view illustrating payment with an IC card using the invention.

Described next is the case where an IC card using an ID chip of the invention is utilized as electronic money. In FIG. 29, payment is carried out by using an IC card 2901. The IC card 2901 has an ID chip 2902 of the invention. In utilizing the IC card 2901, a register 2903 and a reader/writer 2904 are used. The sum of money of the IC card 2901 is stored in the ID chip 2902, and the data on the sum can be read by a non-contact means by the reader/writer 2904 to be sent to the register 2903. The register 2903 checks that the sum of money of the IC card 2901 is larger than the payment amount to carry out the payment. Then, data on the remaining amount in the IC card 2901 is sent to the reader/writer 2904. The reader/writer 2904 can write the data on the remaining amount into the ID chip 2902 of the IC card 2901.

The reader/writer 2904 may be provided with a key 2905 for inputting a password so that unauthorized payment using the IC card 2901 by a third party can be restricted. Note that this embodiment describes only examples and the invention is not limited to these applications.

As described above, the application range of the invention is quite wide and the invention can be applied as an individual recognition chip for any product. Further, this embodiment can be implemented by using any combination of the configurations described in the embodiment modes and Embodiments 1 to 10.

EXPLANATION OF REFERENCE

21: connecting wiring, 51: wiring, 53: interlayer film, 54: protective film, 55: protective film, 56: gate electrode, 57: island-shaped semiconductor film, 58: gate insulating film, 60: substrate, 61: peeling layer, 62: resist, 63: resist, 64: impurity element imparting n-type conductivity, 65: n-type low concentration impurity region, 66: resist, 67: impurity element imparting p-type conductivity, 68: p-type high concentration impurity region, 69: n-type TFT, 70: p-type TFT, 71: n-type TFT, 72: p-type TFT, 73: CPU, 74: memory, 75: insulating film, 76: sidewall, 77: resist, 78: impurity element imparting n-type conductivity, 79: n-type high concentration impurity region, 80: terminal portion, 100: semiconductor device, 101: antenna circuit, 102: voltage detecting circuit, 103: current amplifier circuit, 104: signal processing circuit, 105: fuse, 150: current direction, 151: drain electrode, 152: gate electrode, 153: source electrode, 200: semiconductor device, 201: antenna circuit, 202: rectifier circuit, 203: stabilizing power source circuit, 205: modulating circuit, 206: amplifier, 207: logic circuit, 208: amplifier, 209: logic circuit, 211: memory circuit, 212: memory control circuit, 213: demodulating circuit, 214: signal processing circuit, 301: antenna coil, 302: tuning capacitor, 303: diode, 304: diode, 305: smoothing capacitor, 401: ID chip, 402: antenna unit, 403: interrogator (reader/writer), 404: bag, 500: semiconductor device, 501: antenna circuit, 502: voltage detecting circuit, 503: current amplifier circuit, 504: signal processing circuit, 505: TFT, 506: diode, 507: fuse, 508: TFT, 601: electrode, 602: electrode, 603: meltdown portion, 604: contact hole, 605: contact hole, 606: wiring, 607: wiring, 608: electrode, 609: electrode, 610: meltdown portion, 700: semiconductor device, 701: antenna circuit, 702: voltage detecting circuit, 703: current amplifier circuit, 704: signal processing circuit, 705: fuse, 706: resistor, 707: resistor, 708: voltage source, 709: comparator, 710: TFT, 800: semiconductor device, 801: antenna circuit, 802: fuse capacitor, 803: signal processing circuit, 900: semiconductor device, 901: antenna circuit, 902: fuse diode, 903: signal processing circuit, 1000: substrate, 1001: antenna, 1002: circuit, 1003: substrate, 1004: antenna, 1005: circuit, 1006: substrate, 1007: antenna, 1008: circuit, 1009: substrate, 1010: antenna, 1011: circuit, 1012: substrate, 1013: antenna, 1014: circuit, 1100: element substrate, 1101: antenna wiring, 1301: first conductive layer, 1302: insulating film, 1303: second conductive layer, 1401: N-type impurity region, 1402: I-type region, 1403: P-type impurity region, 1404: cathode, 1405: gate, 1406: anode, 2000: IC card, 2001: circuit portion, 2010: ID tag, 2011: circuit portion, 2020: merchandise, 2021: protective film, 2022: ID chip, 2030: housing, 2031: ID chip, 2040: tag, 2041: ID chip, 2050: book, 2051: protective film, 2052: ID chip, 2060: paper money, 2061: ID chip, 2070: shoes, 2071: protective film, 2072: ID chip, 2201: resistor, 2202: resistor, 2203: power source, 2204: current supply resistor, 2205: transistor, 2206: transistor, 2207: transistor, 2208: transistor, 2209: transistor, 2210: output terminal,
2301: protective layer, 2302: ID chip, 2303: protective layer, 2304: antenna, 2501: bag, 2502: ID chip, 2601: passport, 2602: ID chip, 2603: driver's license, 2604: ID chip, 2701: package, 2702: label, 2703: ID chip, 2801: label, 2802: ID chip, 2803: beer bottle, 2804: label, 2805: writer device, 2806: belt conveyor, 2807: ID chip, 2901: IC card, 2902: ID chip, 2903: register, 2904: reader/writer, 2905: key, 3000: insulating substrate, 3001: base film, 3002: base film, 3003: island-shaped semiconductor layer, 3004: island-shaped semiconductor layer, 3005: island-shaped semiconductor layer, 3006: gate insulating film, 3007: first conductive layer, 3008: first conductive layer, 3009: first conductive layer, 3010: second gate insulating film, 3011: second conductive layer, 3012: second conductive layer, 3013: second conductive layer, 3014: first impurity region, 3015: first impurity region, 3016: second impurity region, 3017: second impurity region, 3018: third impurity region, 3019: third impurity region, 3020: sidewall, 3021: sidewall, 3022: fourth impurity region, 3023: fourth impurity region, 3024: first interlayer insulating film, 3025: second interlayer insulating film, 3026: electrode, 3027: electrode, 3028: electrode, 3029: electrode, 3030: electrode, 4000: peeling layer, 4001: third interlayer insulating film, 4002: pad, 4003: pad, 4004: pad, 4005: pad, 4006: protective layer, 4007: groove, 4008: adhesive, 4009: support base

What is claimed is:

1. A semiconductor device comprising:
   an antenna circuit;
   a signal processing circuit; and
   an anti-fuse element,
   wherein an output of the antenna circuit is connected to the signal processing circuit and the anti-fuse element,
   wherein the anti-fuse element including a first terminal, a second terminal, and an insulating film interposed between the first terminal and the second terminal,
   wherein the anti-fuse element is configured to short the first terminal and the second terminal by applying an excessive voltage, and
   wherein a power source is not supplied to the signal processing circuit after the first terminal and the second terminal of the anti-fuse element is shorted.

2. The semiconductor device according to claim 1, wherein the signal processing circuit includes a rectifier circuit and a modulating circuit.

3. The semiconductor device according to claim 1, wherein the signal processing circuit is formed over a glass substrate.

4. The semiconductor device according to claim 1, wherein the signal processing circuit is formed over a plastic substrate.

5. The semiconductor device according to claim 1, wherein the signal processing circuit is formed over an insulating film.

6. The semiconductor device according to claim 1, wherein the antenna circuit is provided above or partially above the signal processing circuit.

7. The semiconductor device according to claim 1, wherein a signal inputted to the antenna circuit is a radio signal.

8. An IC card, an IC tag, an RFID, a transponder, paper money, valuable securities, a passport, an electronic device, a bag, and clothes, comprising the semiconductor device according to claim 1.

9. The semiconductor device according to claim 1, wherein data stored in the semiconductor device is not read out after the first terminal and the second terminal of the anti-fuse element is shorted.

10. The semiconductor device according to claim 1, wherein data is not written in the semiconductor device after the first terminal and the second terminal of the anti-fuse element is shorted.

11. A semiconductor device comprising:
    an antenna circuit;
    a signal processing circuit; and
    an anti-fuse element,
    wherein an output of the antenna circuit is connected to the signal processing circuit and the anti-fuse element,
    wherein the anti-fuse element includes a diode having a junction portion,
    wherein the anti-fuse element is configured to short the junction portion of the diode by applying an excessive voltage, and
    wherein a power source is not supplied to the signal processing circuit after the junction portion of the anti-fuse element is shorted.

12. The semiconductor device according to claim 11, wherein the signal processing circuit includes a rectifier circuit and a modulating circuit.

13. The semiconductor device according to claim 11, wherein the signal processing circuit is formed over a glass substrate.

14. The semiconductor device according to claim 11, wherein the signal processing circuit is formed over a plastic substrate.

15. The semiconductor device according to claim 11, wherein the signal processing circuit is formed over an insulating film.

16. The semiconductor device according to claim 11, wherein the antenna circuit is provided above or partially above the signal processing circuit.

17. The semiconductor device according to claim 11, wherein a signal inputted to the antenna circuit is a radio signal.

18. An IC card, an IC tag, an RFID, a transponder, paper money, valuable securities, a passport, an electronic device, a bag, and clothes, comprising the semiconductor device according to claim 11.

19. The semiconductor device according to claim 11, wherein data stored in the semiconductor device is not read out after the junction portion of the anti-fuse element is shorted.

20. The semiconductor device according to claim 11, wherein data is not written in the semiconductor device after the junction portion of the anti-fuse element is shorted.

* * * * *